(12) United States Patent
Olshansky

(10) Patent No.: US 11,144,882 B1
(45) Date of Patent: Oct. 12, 2021

(54) SYSTEMS AND METHODS FOR EVALUATING ACTIONS OVER A COMPUTER NETWORK AND ESTABLISHING LIVE NETWORK CONNECTIONS

(71) Applicant: On Time Staffing Inc., Golden Valley, MN (US)

(72) Inventor: Roman Olshansky, Golden Valley, MN (US)

(73) Assignee: On Time Staffing Inc., Golden Valley, MN (US)

( * ) Notice: Subject to any disclaimer, the term of this patent is extended or adjusted under 35 U.S.C. 154(b) by 0 days.

(21) Appl. No.: 17/025,902

(22) Filed: Sep. 18, 2020

(51) Int. Cl.
| | |
|---|---|
| *G06Q 10/00* | (2012.01) |
| *G06Q 10/10* | (2012.01) |

(Continued)

(52) U.S. Cl.
CPC ..... *G06Q 10/1053* (2013.01); *G06F 16/2457* (2019.01); *G06K 9/00335* (2013.01);
(Continued)

(58) Field of Classification Search
None
See application file for complete search history.

(56) References Cited

U.S. PATENT DOCUMENTS

| | | |
|---|---|---|
| 1,173,785 A | 2/1916 | Deagan |
| 1,686,351 A | 10/1928 | Spitzglass |

(Continued)

FOREIGN PATENT DOCUMENTS

| | | |
|---|---|---|
| AU | 2002310201 | 3/2003 |
| CA | 2206105 | 12/2000 |

(Continued)

OTHER PUBLICATIONS

Pentland, S. J. (2018). Human-analytics in information systems research and applications in personnel selection (Order No. 10829600). Available from ProQuest Dissertations and Theses Professional. (Year: 2018).*

(Continued)

*Primary Examiner* — Gurkanwaljit Singh
(74) *Attorney, Agent, or Firm* — Pauly, DeVries Smith & Deffner LLC

(57) ABSTRACT

Various embodiments provide a method of connecting an employer with a candidate, comprising: receiving criteria data from the employer regarding a job opening; receiving background data from the candidate; recording data of the candidate in a video interview; analyzing the data of the candidate with speech-to-text analysis to identify candidate data, comparing real-time connection attributes to the candidate data; if a threshold amount of real-time connection attributes are satisfied by the candidate data, then sending, a first offer to the employer for a real-time connection with the candidate; receiving an employer acceptance of the first offer for a real-time connection with the candidate; sending a second offer to the candidate for a real-time connection with the employer; receiving a candidate acceptance; and connecting the candidate and the employer in real time by establishing a live audio connection or a live audio and video connection.

16 Claims, 19 Drawing Sheets

(51) Int. Cl.

| | | |
|---|---|---|
| *G06Q 10/06* | (2012.01) | |
| *G06K 9/00* | (2006.01) | |
| *G06F 16/2457* | (2019.01) | |
| *H04N 7/15* | (2006.01) | |
| *H04N 7/14* | (2006.01) | |
| *H04N 21/442* | (2011.01) | |
| *G10L 25/63* | (2013.01) | |
| *G10L 15/00* | (2013.01) | |
| *H04N 21/2187* | (2011.01) | |
| *H04N 1/00* | (2006.01) | |
| *H04N 21/234* | (2011.01) | |

(52) U.S. Cl.
CPC ........ *G06Q 10/06398* (2013.01); *G10L 15/00* (2013.01); *G10L 25/63* (2013.01); *H04N 1/00289* (2013.01); *H04N 7/144* (2013.01); *H04N 7/15* (2013.01); *H04N 21/2187* (2013.01); *H04N 21/23418* (2013.01); *H04N 21/44218* (2013.01); *G06K 9/00302* (2013.01)

(56) References Cited

U.S. PATENT DOCUMENTS

| | | |
|---|---|---|
| 3,152,622 A | 10/1964 | Rothermel |
| 3,764,135 A | 10/1973 | Madison |
| 5,109,281 A | 4/1992 | Kobori et al. |
| 5,410,344 A | 4/1995 | Graves et al. |
| 5,835,667 A | 11/1998 | Wactlar et al. |
| 5,867,209 A | 2/1999 | Irie et al. |
| 5,884,004 A | 3/1999 | Sato et al. |
| 5,886,967 A | 3/1999 | Aramaki |
| 5,897,220 A | 4/1999 | Huang et al. |
| 5,906,372 A | 5/1999 | Recard, Jr. |
| 5,937,138 A | 8/1999 | Fukuda et al. |
| 5,949,792 A | 9/1999 | Yasuda et al. |
| 6,229,904 B1 | 5/2001 | Huang et al. |
| 6,289,165 B1 | 9/2001 | Abecassis |
| 6,484,266 B2 | 11/2002 | Kashiwagi et al. |
| 6,502,199 B2 | 12/2002 | Kashiwagi et al. |
| 6,504,990 B1 | 1/2003 | Abecassis |
| RE37,994 E | 2/2003 | Fukuda et al. |
| 6,600,874 B1 | 7/2003 | Fujita et al. |
| 6,618,723 B1 | 9/2003 | Smith |
| 6,981,000 B2 | 12/2005 | Park et al. |
| 7,095,329 B2 | 8/2006 | Saubolle |
| 7,146,627 B1 | 12/2006 | Ismail et al. |
| 7,293,275 B1 | 11/2007 | Krieger et al. |
| 7,313,539 B1 | 12/2007 | Pappas et al. |
| 7,336,890 B2 | 2/2008 | Lu et al. |
| 7,499,918 B2 | 3/2009 | Ogikubo |
| 7,606,444 B1 | 10/2009 | Erol et al. |
| 7,702,542 B2 | 4/2010 | Aslanian, Jr. |
| 7,725,812 B1 | 5/2010 | Balkus et al. |
| 7,797,402 B2 | 9/2010 | Roos |
| 7,810,117 B2 | 10/2010 | Karnalkar et al. |
| 7,865,424 B2 | 1/2011 | Pappas et al. |
| 7,895,620 B2 | 2/2011 | Haberman et al. |
| 7,904,490 B2 | 3/2011 | Ogikubo |
| 7,962,375 B2 | 6/2011 | Pappas et al. |
| 7,974,443 B2 | 7/2011 | Kipman et al. |
| 7,991,635 B2 | 8/2011 | Hartmann |
| 7,996,292 B2 | 8/2011 | Pappas et al. |
| 8,032,447 B2 | 10/2011 | Pappas et al. |
| 8,046,814 B1 | 10/2011 | Badenell |
| 8,111,326 B1 | 2/2012 | Talwar |
| 8,169,548 B2 | 5/2012 | Ryckman |
| 8,185,543 B1 | 5/2012 | Choudhry et al. |
| 8,229,841 B2 | 7/2012 | Pappas et al. |
| 8,238,718 B2 | 8/2012 | Toyama et al. |
| 8,241,628 B2 | 8/2012 | Diefenbach-streiber et al. |
| 8,266,068 B1 | 9/2012 | Foss et al. |
| 8,300,785 B2 | 10/2012 | White |
| 8,301,550 B2 | 10/2012 | Pappas et al. |
| 8,301,790 B2 | 10/2012 | Morrison et al. |
| 8,326,133 B2 | 12/2012 | Lemmers |
| 8,326,853 B2 | 12/2012 | Richard et al. |
| 8,331,457 B2 | 12/2012 | Mizuno et al. |
| 8,331,760 B2 | 12/2012 | Butcher |
| 8,339,500 B2 | 12/2012 | Hattori et al. |
| 8,358,346 B2 | 1/2013 | Hikita et al. |
| 8,387,094 B1 | 2/2013 | Ho et al. |
| 8,505,054 B1 | 8/2013 | Kirley |
| 8,508,572 B2 | 8/2013 | Ryckman et al. |
| 8,543,450 B2 | 9/2013 | Pappas et al. |
| 8,560,482 B2 | 10/2013 | Miranda et al. |
| 8,566,880 B2 | 10/2013 | Dunker et al. |
| 8,600,211 B2 | 12/2013 | Nagano et al. |
| 8,611,422 B1 | 12/2013 | Yagnik et al. |
| 8,620,771 B2 | 12/2013 | Pappas et al. |
| 8,633,964 B1 | 1/2014 | Zhu |
| 8,650,114 B2 | 2/2014 | Pappas et al. |
| 8,751,231 B1 | 6/2014 | Larsen et al. |
| 8,774,604 B2 | 7/2014 | Torii et al. |
| 8,792,780 B2 | 7/2014 | Hattori |
| 8,824,863 B2 | 9/2014 | Kitamura et al. |
| 8,854,457 B2 | 10/2014 | De Vleeschouwer et al. |
| 8,856,000 B1 | 10/2014 | Larsen et al. |
| 8,902,282 B1 | 12/2014 | Zhu |
| 8,909,542 B2 | 12/2014 | Montero et al. |
| 8,913,103 B1 | 12/2014 | Sargin et al. |
| 8,918,532 B2 | 12/2014 | Lueth et al. |
| 8,930,260 B2 | 1/2015 | Pappas et al. |
| 8,988,528 B2 | 3/2015 | Hikita |
| 9,009,045 B1 | 4/2015 | Larsen et al. |
| 9,015,746 B2 | 4/2015 | Holmdahl et al. |
| 9,026,471 B2 | 5/2015 | Pappas et al. |
| 9,026,472 B2 | 5/2015 | Pappas et al. |
| 9,047,634 B2 | 6/2015 | Pappas et al. |
| 9,064,258 B2 | 6/2015 | Pappas et al. |
| 9,070,150 B2 | 6/2015 | Pappas et al. |
| 9,092,813 B2 | 7/2015 | Pappas et al. |
| 9,106,804 B2 | 8/2015 | Roberts et al. |
| 9,111,579 B2 | 8/2015 | Meaney et al. |
| 9,117,201 B2 | 8/2015 | Kennell et al. |
| 9,129,640 B2 | 9/2015 | Hamer |
| 9,135,674 B1 | 9/2015 | Yagnik et al. |
| 9,223,781 B2 | 12/2015 | Pearson et al. |
| 9,224,156 B2 | 12/2015 | Moorer |
| 9,305,286 B2 | 4/2016 | Larsen et al. |
| 9,305,287 B2 | 4/2016 | Krishnamoorthy et al. |
| 9,355,151 B1 | 5/2016 | Cranfill et al. |
| 9,378,486 B2 | 6/2016 | Taylor et al. |
| 9,398,315 B2 | 7/2016 | Oks et al. |
| 9,402,050 B1 | 7/2016 | Recchia et al. |
| 9,437,247 B2 | 9/2016 | Pendergast et al. |
| 9,438,934 B1 | 9/2016 | Zhu |
| 9,443,556 B2 | 9/2016 | Cordell et al. |
| 9,456,174 B2 | 9/2016 | Boyle et al. |
| 9,462,301 B2 | 10/2016 | Pásko |
| 9,501,663 B1 | 11/2016 | Hopkins, III et al. |
| 9,501,944 B2 | 11/2016 | Boneta et al. |
| 9,542,452 B1 | 1/2017 | Ross et al. |
| 9,544,380 B2 | 1/2017 | Deng et al. |
| 9,554,160 B2 | 1/2017 | Han et al. |
| 9,570,107 B2 | 2/2017 | Boiman et al. |
| 9,583,144 B2 | 2/2017 | Ricciardi |
| 9,600,723 B1 | 3/2017 | Pantofaru et al. |
| 9,607,655 B2 | 3/2017 | Bloch et al. |
| 9,652,745 B2 | 5/2017 | Taylor et al. |
| 9,653,115 B2 | 5/2017 | Bloch et al. |
| 9,666,194 B2 | 5/2017 | Ondeck et al. |
| 9,684,435 B2 | 6/2017 | Carr et al. |
| 9,693,019 B1 | 6/2017 | Fluhr et al. |
| 9,710,790 B2 | 7/2017 | Taylor et al. |
| 9,723,223 B1 | 8/2017 | Banta et al. |
| 9,747,573 B2 | 8/2017 | Shaburov et al. |
| 9,792,955 B2 | 10/2017 | Fleischhauer et al. |
| 9,805,767 B1 | 10/2017 | Strickland |
| 9,823,809 B2 | 11/2017 | Roos |
| 9,876,963 B2 | 1/2018 | Nakamura et al. |
| 9,881,647 B2 | 1/2018 | Mccauley et al. |
| 9,936,185 B2 | 4/2018 | Delvaux et al. |
| 9,940,508 B2 | 4/2018 | Kaps et al. |

(56) References Cited

U.S. PATENT DOCUMENTS

| | | |
|---|---|---|
| 9,940,973 B2 | 4/2018 | Roberts et al. |
| 9,979,921 B2 | 5/2018 | Holmes |
| 10,008,239 B2 | 6/2018 | Eris |
| 10,019,653 B2* | 7/2018 | Wilf .................. G06K 9/6256 |
| 10,021,377 B2 | 7/2018 | Newton et al. |
| 10,108,932 B2 | 10/2018 | Sung et al. |
| 10,115,038 B2 | 10/2018 | Hazur et al. |
| 10,147,460 B2 | 12/2018 | Ullrich |
| 10,152,695 B1 | 12/2018 | Chiu et al. |
| 10,152,696 B2 | 12/2018 | Thankappan et al. |
| 10,168,866 B2 | 1/2019 | Wakeen et al. |
| 10,178,427 B2 | 1/2019 | Huang |
| 10,235,008 B2 | 3/2019 | Lee et al. |
| 10,242,345 B2 | 3/2019 | Taylor et al. |
| 10,268,736 B1 | 4/2019 | Balasia et al. |
| 10,296,873 B1 | 5/2019 | Balasia et al. |
| 10,310,361 B1* | 6/2019 | Featherstone ...... G06K 9/00221 |
| 10,318,927 B2 | 6/2019 | Champaneria |
| 10,325,243 B1 | 6/2019 | Ross et al. |
| 10,325,517 B2 | 6/2019 | Nielson et al. |
| 10,346,805 B2 | 7/2019 | Taylor et al. |
| 10,346,928 B2 | 7/2019 | Li et al. |
| 10,353,720 B1* | 7/2019 | Wich-Vila ........ G06Q 10/06395 |
| 10,433,030 B2 | 10/2019 | Packard et al. |
| 10,438,135 B2 | 10/2019 | Larsen et al. |
| 10,607,188 B2 | 3/2020 | Kyllonen et al. |
| 10,657,498 B2 | 5/2020 | Dey et al. |
| 10,694,097 B1* | 6/2020 | Shirakyan .......... H04N 1/00289 |
| 10,728,443 B1 | 7/2020 | Olshansky |
| 10,735,396 B2 | 8/2020 | Krstic et al. |
| 10,748,118 B2 | 8/2020 | Fang |
| 10,796,217 B2 | 10/2020 | Wu |
| 10,963,841 B2 | 3/2021 | Olshansky |
| 11,023,735 B1 | 6/2021 | Olshansky |
| 2001/0001160 A1 | 5/2001 | Shoff et al. |
| 2001/0038746 A1 | 11/2001 | Hughes et al. |
| 2002/0097984 A1 | 7/2002 | Abecassis |
| 2002/0113879 A1 | 8/2002 | Battle et al. |
| 2002/0122659 A1 | 9/2002 | Mcgrath et al. |
| 2002/0191071 A1 | 12/2002 | Rui et al. |
| 2003/0005429 A1 | 1/2003 | Colsey |
| 2003/0027611 A1 | 2/2003 | Recard, Jr. |
| 2003/0189589 A1 | 10/2003 | Leblanc et al. |
| 2003/0194211 A1 | 10/2003 | Abecassis |
| 2004/0033061 A1 | 2/2004 | Hughes et al. |
| 2004/0186743 A1* | 9/2004 | Cordero, Jr. ....... G06Q 10/1053 705/321 |
| 2004/0264919 A1 | 12/2004 | Taylor et al. |
| 2005/0095569 A1 | 5/2005 | Franklin |
| 2005/0137896 A1 | 6/2005 | Pentecost et al. |
| 2005/0187765 A1 | 8/2005 | Kim et al. |
| 2005/0232462 A1 | 10/2005 | Vallone et al. |
| 2005/0235033 A1 | 10/2005 | Doherty |
| 2005/0271251 A1 | 12/2005 | Russell et al. |
| 2006/0042483 A1 | 3/2006 | Work et al. |
| 2006/0045179 A1 | 3/2006 | Mizuno et al. |
| 2006/0100919 A1 | 5/2006 | Levine |
| 2006/0116555 A1* | 6/2006 | Pavlidis ................. A61B 5/164 600/300 |
| 2006/0229896 A1* | 10/2006 | Rosen ................ G06Q 10/1053 705/321 |
| 2007/0088601 A1 | 4/2007 | Money et al. |
| 2007/0124161 A1 | 5/2007 | Mueller et al. |
| 2007/0237502 A1 | 10/2007 | Ryckman et al. |
| 2007/0288245 A1 | 12/2007 | Benjamin |
| 2008/0086504 A1 | 4/2008 | Sanders et al. |
| 2009/0083103 A1 | 3/2009 | Basser |
| 2009/0083670 A1 | 3/2009 | Roos |
| 2009/0087161 A1 | 4/2009 | Roberts et al. |
| 2009/0144785 A1 | 6/2009 | Walker et al. |
| 2009/0171899 A1 | 7/2009 | Chittoor et al. |
| 2009/0248685 A1* | 10/2009 | Pasqualoni ......... G06F 16/9535 |
| 2009/0258334 A1 | 10/2009 | Pyne |
| 2010/0086283 A1 | 4/2010 | Ramachandran et al. |
| 2010/0143329 A1 | 6/2010 | Larsen |
| 2010/0183280 A1 | 7/2010 | Beauregard et al. |
| 2010/0191561 A1 | 7/2010 | Jeng et al. |
| 2010/0199228 A1 | 8/2010 | Latta et al. |
| 2010/0223109 A1 | 9/2010 | Hawn et al. |
| 2010/0325307 A1 | 12/2010 | Roos |
| 2011/0055098 A1 | 3/2011 | Stewart |
| 2011/0055930 A1 | 3/2011 | Flake et al. |
| 2011/0060671 A1* | 3/2011 | Erbey .................... G06Q 40/00 705/35 |
| 2011/0076656 A1 | 3/2011 | Scott et al. |
| 2011/0088081 A1 | 4/2011 | Folkesson et al. |
| 2011/0135279 A1 | 6/2011 | Leonard |
| 2012/0036127 A1 | 2/2012 | Work et al. |
| 2012/0053996 A1 | 3/2012 | Galbavy |
| 2012/0084649 A1 | 4/2012 | Dowdell et al. |
| 2012/0114246 A1 | 5/2012 | Weitzman |
| 2012/0130771 A1 | 5/2012 | Kannan et al. |
| 2012/0257875 A1 | 10/2012 | Sharpe et al. |
| 2012/0271774 A1 | 10/2012 | Clegg |
| 2013/0007670 A1 | 1/2013 | Roos |
| 2013/0016815 A1 | 1/2013 | Odinak et al. |
| 2013/0016816 A1 | 1/2013 | Odinak et al. |
| 2013/0016823 A1 | 1/2013 | Odinak et al. |
| 2013/0024105 A1 | 1/2013 | Thomas |
| 2013/0111401 A1 | 5/2013 | Newman et al. |
| 2013/0121668 A1 | 5/2013 | Meaney et al. |
| 2013/0124998 A1 | 5/2013 | Pendergast et al. |
| 2013/0124999 A1 | 5/2013 | Agnoli et al. |
| 2013/0125000 A1 | 5/2013 | Fleischhauer et al. |
| 2013/0177296 A1 | 7/2013 | Geisner et al. |
| 2013/0212033 A1 | 8/2013 | Work et al. |
| 2013/0212180 A1 | 8/2013 | Work et al. |
| 2013/0216206 A1 | 8/2013 | Dubin et al. |
| 2013/0218688 A1 | 8/2013 | Roos |
| 2013/0222601 A1 | 8/2013 | Engstroem et al. |
| 2013/0226578 A1 | 8/2013 | Bolton et al. |
| 2013/0226674 A1 | 8/2013 | Field et al. |
| 2013/0226910 A1 | 8/2013 | Work et al. |
| 2013/0254192 A1 | 9/2013 | Work et al. |
| 2013/0259447 A1 | 10/2013 | Sathish et al. |
| 2013/0266925 A1 | 10/2013 | Nunamaker, Jr. et al. |
| 2013/0268452 A1 | 10/2013 | Macewen et al. |
| 2013/0283378 A1 | 10/2013 | Costigan et al. |
| 2013/0290210 A1 | 10/2013 | Cline et al. |
| 2013/0290325 A1 | 10/2013 | Work et al. |
| 2013/0290420 A1 | 10/2013 | Work et al. |
| 2013/0290448 A1 | 10/2013 | Work et al. |
| 2013/0297589 A1 | 11/2013 | Work et al. |
| 2013/0332381 A1 | 12/2013 | Clark et al. |
| 2013/0332382 A1* | 12/2013 | LaPasta ............. G06Q 10/1053 705/321 |
| 2014/0036023 A1 | 2/2014 | Croen et al. |
| 2014/0089217 A1 | 3/2014 | McGovern et al. |
| 2014/0092254 A1 | 4/2014 | Mughal et al. |
| 2014/0123177 A1 | 5/2014 | Kim et al. |
| 2014/0125703 A1 | 5/2014 | Roveta et al. |
| 2014/0143165 A1 | 5/2014 | Posse et al. |
| 2014/0153902 A1 | 6/2014 | Pearson et al. |
| 2014/0186004 A1 | 7/2014 | Hamer |
| 2014/0191939 A1 | 7/2014 | Penn et al. |
| 2014/0192200 A1 | 7/2014 | Zagron |
| 2014/0198196 A1 | 7/2014 | Howard et al. |
| 2014/0214709 A1* | 7/2014 | Greaney ............ G06Q 10/1053 705/321 |
| 2014/0245146 A1 | 8/2014 | Roos |
| 2014/0258288 A1 | 9/2014 | Work et al. |
| 2014/0270706 A1 | 9/2014 | Pasko |
| 2014/0278506 A1 | 9/2014 | Rogers et al. |
| 2014/0278683 A1 | 9/2014 | Kennell et al. |
| 2014/0279634 A1 | 9/2014 | Seeker |
| 2014/0282709 A1 | 9/2014 | Hardy et al. |
| 2014/0317009 A1 | 10/2014 | Bilodeau et al. |
| 2014/0317126 A1 | 10/2014 | Work et al. |
| 2014/0325359 A1 | 10/2014 | Vehovsky et al. |
| 2014/0325373 A1* | 10/2014 | Kramer ................ G06F 3/0425 715/740 |
| 2014/0327779 A1 | 11/2014 | Eronen et al. |
| 2014/0330734 A1 | 11/2014 | Sung et al. |
| 2014/0336942 A1 | 11/2014 | Pe'er et al. |

(56) References Cited

U.S. PATENT DOCUMENTS

| | | |
|---|---|---|
| 2014/0337900 A1 | 11/2014 | Hurley |
| 2014/0356822 A1 | 12/2014 | Hoque et al. |
| 2014/0358810 A1 | 12/2014 | Hardtke et al. |
| 2014/0359439 A1 | 12/2014 | Lyren |
| 2015/0003603 A1 | 1/2015 | Odinak et al. |
| 2015/0003605 A1 | 1/2015 | Odinak et al. |
| 2015/0006422 A1 | 1/2015 | Carter et al. |
| 2015/0012453 A1 | 1/2015 | Odinak et al. |
| 2015/0046357 A1 | 2/2015 | Danson et al. |
| 2015/0063775 A1 | 3/2015 | Nakamura et al. |
| 2015/0067723 A1 | 3/2015 | Bloch et al. |
| 2015/0099255 A1 | 4/2015 | Aslan et al. |
| 2015/0100702 A1 | 4/2015 | Krishna et al. |
| 2015/0127565 A1 | 5/2015 | Chevalier et al. |
| 2015/0139601 A1 | 5/2015 | Mate et al. |
| 2015/0154564 A1 | 6/2015 | Moon et al. |
| 2015/0155001 A1 | 6/2015 | Kikugawa et al. |
| 2015/0170303 A1 | 6/2015 | Geritz et al. |
| 2015/0201134 A1 | 7/2015 | Carr et al. |
| 2015/0205800 A1 | 7/2015 | Work et al. |
| 2015/0205872 A1 | 7/2015 | Work et al. |
| 2015/0206102 A1 | 7/2015 | Cama et al. |
| 2015/0222815 A1 | 8/2015 | Wang et al. |
| 2015/0228306 A1 | 8/2015 | Roberts et al. |
| 2015/0242707 A1* | 8/2015 | Wilf ............... G06K 9/6256 382/159 |
| 2015/0269165 A1 | 9/2015 | Work et al. |
| 2015/0269529 A1 | 9/2015 | Kyllonen et al. |
| 2015/0269530 A1 | 9/2015 | Work et al. |
| 2015/0271289 A1 | 9/2015 | Work et al. |
| 2015/0278223 A1 | 10/2015 | Work et al. |
| 2015/0278290 A1 | 10/2015 | Work et al. |
| 2015/0278964 A1 | 10/2015 | Work et al. |
| 2015/0324698 A1 | 11/2015 | Karaoguz et al. |
| 2015/0339939 A1 | 11/2015 | Gustafson et al. |
| 2015/0356512 A1 | 12/2015 | Bradley |
| 2015/0380052 A1 | 12/2015 | Hamer |
| 2016/0005029 A1 | 1/2016 | Ivey et al. |
| 2016/0036976 A1 | 2/2016 | Odinak et al. |
| 2016/0104096 A1 | 4/2016 | Ovick et al. |
| 2016/0116827 A1 | 4/2016 | Tarres Bolos |
| 2016/0117942 A1 | 4/2016 | Marino et al. |
| 2016/0139562 A1 | 5/2016 | Crowder et al. |
| 2016/0154883 A1 | 6/2016 | Boerner |
| 2016/0155475 A1 | 6/2016 | Hamer |
| 2016/0180234 A1 | 6/2016 | Siebach et al. |
| 2016/0180883 A1 | 6/2016 | Hamer |
| 2016/0219264 A1 | 7/2016 | Delvaux et al. |
| 2016/0225409 A1 | 8/2016 | Eris |
| 2016/0225410 A1 | 8/2016 | Lee et al. |
| 2016/0247537 A1 | 8/2016 | Ricciardi |
| 2016/0267436 A1 | 9/2016 | Silber et al. |
| 2016/0313892 A1 | 10/2016 | Roos |
| 2016/0323608 A1 | 11/2016 | Bloch et al. |
| 2016/0330398 A1 | 11/2016 | Recchia et al. |
| 2016/0364692 A1 | 12/2016 | Bhaskaran et al. |
| 2017/0026667 A1 | 1/2017 | Pasko |
| 2017/0039525 A1 | 2/2017 | Seidle et al. |
| 2017/0076751 A9 | 3/2017 | Hamer |
| 2017/0134776 A1 | 5/2017 | Ranjeet et al. |
| 2017/0164013 A1 | 6/2017 | Abramov et al. |
| 2017/0164014 A1 | 6/2017 | Abramov et al. |
| 2017/0164015 A1 | 6/2017 | Abramov et al. |
| 2017/0171602 A1 | 6/2017 | Qu |
| 2017/0178688 A1 | 6/2017 | Ricciardi |
| 2017/0195491 A1 | 7/2017 | Odinak et al. |
| 2017/0206504 A1 | 7/2017 | Taylor et al. |
| 2017/0213190 A1* | 7/2017 | Hazan ............... G06Q 10/1053 |
| 2017/0213573 A1 | 7/2017 | Takeshita et al. |
| 2017/0227353 A1* | 8/2017 | Brunner ............... G06K 9/342 |
| 2017/0236073 A1 | 8/2017 | Borisyuk et al. |
| 2017/0244894 A1 | 8/2017 | Aggarwal et al. |
| 2017/0244984 A1 | 8/2017 | Aggarwal et al. |
| 2017/0244991 A1 | 8/2017 | Aggarwal et al. |
| 2017/0262706 A1 | 9/2017 | Sun et al. |
| 2017/0264958 A1 | 9/2017 | Hutten |
| 2017/0293413 A1 | 10/2017 | Matsushita et al. |
| 2017/0316806 A1 | 11/2017 | Warren et al. |
| 2017/0332044 A1 | 11/2017 | Marlow et al. |
| 2017/0353769 A1 | 12/2017 | Husain et al. |
| 2017/0372748 A1 | 12/2017 | Mccauley et al. |
| 2018/0011621 A1 | 1/2018 | Roos |
| 2018/0025303 A1 | 1/2018 | Janz |
| 2018/0054641 A1 | 2/2018 | Hall et al. |
| 2018/0070045 A1 | 3/2018 | Holmes |
| 2018/0074681 A1 | 3/2018 | Roos |
| 2018/0082238 A1 | 3/2018 | Shani |
| 2018/0096307 A1 | 4/2018 | Fortier et al. |
| 2018/0109737 A1 | 4/2018 | Nakamura et al. |
| 2018/0109826 A1 | 4/2018 | Mccoy et al. |
| 2018/0110460 A1 | 4/2018 | Danson et al. |
| 2018/0114154 A1 | 4/2018 | Bae |
| 2018/0130497 A1 | 5/2018 | Mccauley et al. |
| 2018/0132014 A1 | 5/2018 | Khazanov et al. |
| 2018/0150604 A1 | 5/2018 | Arena et al. |
| 2018/0158027 A1 | 6/2018 | Venigalla |
| 2018/0182436 A1 | 6/2018 | Ullrich |
| 2018/0191955 A1 | 7/2018 | Aoki et al. |
| 2018/0218238 A1 | 8/2018 | Viirre et al. |
| 2018/0226102 A1 | 8/2018 | Roberts et al. |
| 2018/0227501 A1 | 8/2018 | King |
| 2018/0232751 A1 | 8/2018 | Terhark et al. |
| 2018/0247271 A1 | 8/2018 | Van Hoang et al. |
| 2018/0253697 A1 | 9/2018 | Sung et al. |
| 2018/0268868 A1 | 9/2018 | Salokannel et al. |
| 2018/0270613 A1 | 9/2018 | Park |
| 2018/0302680 A1 | 10/2018 | Cormican |
| 2018/0308521 A1 | 10/2018 | Iwamoto |
| 2018/0316947 A1 | 11/2018 | Todd |
| 2018/0336528 A1 | 11/2018 | Carpenter et al. |
| 2018/0336930 A1 | 11/2018 | Takahashi |
| 2018/0350405 A1 | 12/2018 | Marco et al. |
| 2018/0353769 A1 | 12/2018 | Smith et al. |
| 2018/0374251 A1 | 12/2018 | Mitchell et al. |
| 2018/0376225 A1 | 12/2018 | Jones et al. |
| 2019/0005373 A1 | 1/2019 | Nims et al. |
| 2019/0019157 A1 | 1/2019 | Saha et al. |
| 2019/0057356 A1 | 2/2019 | Larsen et al. |
| 2019/0087558 A1 | 3/2019 | Mercury et al. |
| 2019/0096307 A1 | 3/2019 | Liang et al. |
| 2019/0141033 A1 | 5/2019 | Kaafar et al. |
| 2019/0220824 A1 | 7/2019 | Liu |
| 2019/0244176 A1 | 8/2019 | Chuang et al. |
| 2019/0259002 A1 | 8/2019 | Balasia et al. |
| 2019/0295040 A1 | 9/2019 | Clines |
| 2019/0311488 A1 | 10/2019 | Sareen |
| 2019/0325064 A1 | 10/2019 | Mathiesen et al. |
| 2020/0012350 A1 | 1/2020 | Tay |
| 2020/0110786 A1 | 4/2020 | Kim |
| 2020/0126545 A1 | 4/2020 | Kakkar et al. |
| 2020/0143329 A1* | 5/2020 | Gamaliel ......... H04N 21/45455 |
| 2020/0311163 A1 | 10/2020 | Ma et al. |
| 2020/0311682 A1 | 10/2020 | Olshansky |
| 2020/0311953 A1 | 10/2020 | Olshansky |
| 2020/0396376 A1 | 12/2020 | Olshansky |
| 2021/0035047 A1 | 2/2021 | Mossoba et al. |
| 2021/0174308 A1 | 6/2021 | Olshansky |
| 2021/0233262 A1 | 7/2021 | Olshansky |

FOREIGN PATENT DOCUMENTS

| | | |
|---|---|---|
| CA | 2763634 | 12/2012 |
| CN | 109146430 | 1/2019 |
| EP | 1376584 | 1/2004 |
| EP | 1566748 | 8/2005 |
| EP | 1775949 | 12/2007 |
| EP | 1954041 | 8/2008 |
| JP | 2009258175 | 11/2009 |
| JP | 2019016192 | 1/2019 |
| WO | 9703366 | 1/1997 |
| WO | 9713366 | 4/1997 |
| WO | 9713367 | 4/1997 |
| WO | 9828908 | 7/1998 |
| WO | 9841978 | 9/1998 |

(56) References Cited

FOREIGN PATENT DOCUMENTS

| | | |
|---|---|---|
| WO | 9905865 | 2/1999 |
| WO | 0133421 | 5/2001 |
| WO | 0117250 | 9/2002 |
| WO | 03003725 | 1/2003 |
| WO | 2004062563 | 7/2004 |
| WO | 2005114377 | 12/2005 |
| WO | 2006103578 | 10/2006 |
| WO | 2006129496 | 12/2006 |
| WO | 2007039994 | 4/2007 |
| WO | 2007097218 | 8/2007 |
| WO | 2008029803 | 3/2008 |
| WO | 2008039407 | 4/2008 |
| WO | 2009042858 | 4/2009 |
| WO | 2009042900 | 4/2009 |
| WO | 2009075190 | 6/2009 |
| WO | 2009116955 | 9/2009 |
| WO | 2009157446 | 12/2009 |
| WO | 2010055624 | 5/2010 |
| WO | 2010116998 | 10/2010 |
| WO | 2011001180 | 1/2011 |
| WO | 2011007011 | 1/2011 |
| WO | 2011035419 | 3/2011 |
| WO | 2011129578 | 10/2011 |
| WO | 2011136571 | 11/2011 |
| WO | 2012002896 | 1/2012 |
| WO | 2012068433 | 5/2012 |
| WO | 2012039959 | 6/2012 |
| WO | 2012089855 | 7/2012 |
| WO | 2013026095 | 2/2013 |
| WO | 2013039351 | 3/2013 |
| WO | 2013074207 | 5/2013 |
| WO | 2013088208 | 6/2013 |
| WO | 2013093176 | 6/2013 |
| WO | 2013131134 | 9/2013 |
| WO | 2013165923 | 11/2013 |
| WO | 2014089362 | 6/2014 |
| WO | 2014093668 | 6/2014 |
| WO | 2014152021 | 9/2014 |
| WO | 2014163283 | 10/2014 |
| WO | 2014164549 | 10/2014 |
| WO | 2015031946 | 4/2015 |
| WO | 2015071490 | 5/2015 |
| WO | 2015109290 | 7/2015 |
| WO | 2016031431 | 3/2016 |
| WO | 2016053522 | 4/2016 |
| WO | 2016073206 | 5/2016 |
| WO | 2016123057 | 8/2016 |
| WO | 2016138121 | 9/2016 |
| WO | 2016138161 | 9/2016 |
| WO | 2016186798 | 11/2016 |
| WO | 2016189348 | 12/2016 |
| WO | 2017022641 | 2/2017 |
| WO | 2017042831 | 3/2017 |
| WO | 2017049612 | 3/2017 |
| WO | 2017051063 | 3/2017 |
| WO | 2017096271 | 8/2017 |
| WO | 2017130810 | 8/2017 |
| WO | 2017150772 | 9/2017 |
| WO | 2017192125 | 11/2017 |
| WO | 2018042175 | 3/2018 |
| WO | 2018094443 | 5/2018 |
| WO | 2020198230 | 10/2020 |
| WO | 2020198240 | 10/2020 |
| WO | 2020198363 | 10/2020 |
| WO | 2021108564 | 6/2021 |

OTHER PUBLICATIONS

Alley, E. (2016). Professional autonomy in video relay service interpreting: Perceptions of american sign language-english interpreters (Order No. 10304259). Available from ProQuest Dissertations and Theses Professional. (Year: 2016).*

Johnston, A. M. (2003). A mediated discourse analysis of immigration gatekeeping interviews (Order No. 3093235). Available from ProQuest Dissertations and Theses Professional (Year: 2003).*

Hughes, K. (2015). Corporate channels: How american business and industry made television useful (Order No. 10186420). Available from ProQuest Dissertations and Theses Professional. (Year: 2015).*

Swanepoel, De Wet, and James W. Hall III. "A systematic review of telehealth applications in audiology." Telemedicine and e-Health 16.2 (2010): 181-200. (Year: 2010).*

"Final Office Action," for U.S. Appl. No. 16/696,781 dated Oct. 8, 2020 (26 pages).

"Notice of Allowance," for U.S. Appl. No. 16/366,703 dated Nov. 18, 2020 (19 pages).

Ramanarayanan, Vikram et al., "Evaluating Speech, Face, Emotion and Body Movement Time-series Features for Automated Multimodal Presentation Scoring," In Proceedings of the 2015 ACM on (ICMI 2015). Association for Computing Machinery, New York, NY, USA, 23-30 (8 pages).

"Response to Final Office Action," for U.S. Appl. No. 16/696,781, filed Dec. 8, 2020 (18 pages).

"Response to Non Final Office Action," for U.S. Appl. No. 16/828,578, filed Dec. 22, 2020 (17 pages).

File History for U.S. Appl. No. 16/366,746 downloaded Aug. 21, 2020 (514 pages).

File History for U.S. Appl. No. 16/366,703 downloaded Oct. 2, 2020 (617 pages).

File History for U.S. Appl. No. 16/696,781 downloaded Oct. 2, 2020 (254 pages).

"International Search Report and Written Opinion," for PCT Application No. PCT/US2020/024470 dated Jul. 9, 2020 (13 pages).

"International Search Report and Written Opinion," for PCT Application No. PCT/US2020/024488 dated May 19, 2020 (14 pages).

"International Search Report and Written Opinion," for PCT Application No. PCT/US2020/024722 dated Jul. 10, 2020 (13 pages).

"Non-Final Office Action," for U.S. Appl. No. 16/828,578 dated Sep. 24, 2020 (39 pages).

"Air Canada Keeping Your Points Active Aeroplan," https://www.aircanada.com/us/en/aco/home/aeroplan/your-aeroplan/inactivity-policy.html, 6 pages.

"American Express Frequently Asked Question: Why were Membersip Rewards points forfeited and how can I reinstate them?," https://www.americanexpress.com/us/customer-service/faq.membership-rewards-points-forfeiture.html, 2 pages.

Brocardo, Marcelo L. et al., "Verifying Online User Identity using Stylometric Analysis for Short Messages," Journal of Networks, vol. 9, No. 12, Dec. 2014, pp. 3347-3355.

"International Search Report and Written Opinion," for PCT Application No. PCT/US2020/062246 dated Apr. 1, 2021 (18 pages).

"Response to Non Final Office Action," for U.S. Appl. No. 16/696,781, filed Apr. 23, 2021 (16 pages).

Advantage Video Systems, "Jeffrey Stansfield of AVS interviews rep about Air-Hush products at the 2019 NAMM Expo," YouTube video, available at https://www.youtube.com/watch?v=nWzrM99qk_o, accessed Jan. 17, 2021.

"Final Office Action," for U.S. Appl. No. 16/828,578 dated Jan. 14, 2021 (27 pages).

"Invitation to Pay Additional Fees," for PCT Application No. PCT/US2020/062246 dated Feb. 11, 2021 (14 pages).

"Non-Final Office Action," for U.S. Appl. No. 16/696,781 dated Jan. 26, 2021 (28 pages).

"Notice of Allowance," for U.S. Appl. No. 16/931,964 dated Feb. 2, 2021 (42 pages).

"Response to Advisory Action," for U.S. Appl. No. 16/696,781, filed Jan. 8, 2021 (22 pages).

"International Search Report and Written Opinion," for PCT Application No. PCT/US2021/024423 dated Jun. 16, 2021 (13 pages).

"International Search Report and Written Opinion," for PCT Application No. PCT/US2021/024450 dated Jun. 4, 2021 (14 pages).

"Non-Final Office Action," for U.S. Appl. No. 16/910,986 dated Jun. 23, 2021 (70 pages).

"Notice of Allowance," for U.S. Appl. No. 16/696,781 dated May 17, 2021 (20 pages).

(56) References Cited

OTHER PUBLICATIONS

"Notice of Allowance," for U.S. Appl. No. 17/212,688 dated Jun. 9, 2021 (39 pages).
"Nurse Resumes," Post Job Free Resume Search Results for "nurse" available at URL <https://www.postjobfree.com/resumes?q=nurse&l=&radius=25> at least as early as Jan. 26, 2021 (2 pages).
"Nurse," LiveCareer Resume Search results available online at URL <https://www.livecareer.com/resume-search/search?jt=nurse> website published as early as Dec. 21, 2017 (4 pages).
"Resume Database," Mighty Recruiter Resume Database available online at URL <https://www.mightyrecruiter.com/features/resume-database> at least as early as Sep. 4, 2017 (6 pages).
"Resume Library," Online job board available at Resume-library.com at least as early as Aug. 6, 2019 (6 pages).
"Television Studio," Wikipedia, Published Mar. 8, 2019 and retrieved May 27, 2021 from URL <https://en.wikipedia.org/w/index/php?title=Television_studio&oldid=886710983> (3 pages).
"Understanding Multi-Dimensionality in Vector Space Modeling," Pythonic Excursions article published Apr. 16, 2019, accessible at URL <https://aegis4048.github.io/understanding_multi-dimensionality_in_vector_space_modeling> (29 pages).
Wang, Jenny "How to Build a Resume Recommender like the Applicant Tracking System (ATS)," Towards Data Science article published Jun. 25, 2020, accessible at URL <https://towardsdatascience.com/resume-screening-tool-resume-Yecommendation-engine-in-a-nutshell-53fcf6e6559b> (14 pages).

\* cited by examiner

SYSTEMS AND METHODS FOR EVALUATING ACTIONS OVER A COMPUTER NETWORK AND ESTABLISHING LIVE NETWORK CONNECTIONS

FIELD

Various embodiments relate to systems and methods for linking and connecting two login entities over a computer network in real time. More specifically, the systems and methods automatically analyze and assign traits based on the actions of one login entity. If appropriate traits are assigned during the analysis, a live connection is established between that one login entity and a second login entity.

SUMMARY

Various embodiments provide a method of connecting an employer with a candidate. The method can include receiving, at a system server, criteria data from the employer regarding a job opening, wherein the criteria data from the employer includes minimum attributes and real-time connection attributes. The method can include receiving, at the system server, background data from the candidate, recording audio data and video data of the candidate in a video interview of the candidate in a booth with a first camera, a second camera, and a microphone. The method can include analyzing prior to an end of the video interview, at the system server, the audio data of the candidate with speech-to-text analysis to identify textual video interview data, wherein candidate data includes the textual video interview data and the background data. The method can include comparing the minimum attributes to the candidate data to determine if the minimum attributes are satisfied by the candidate data. The method can include if the minimum attributes are present in the candidate data, then comparing the real-time connection attributes to the candidate data to determine if a threshold amount of the real-time connection attributes are satisfied by the candidate data. The method can include if the threshold amount of real-time connection attributes are satisfied by the candidate data, then sending, over a communication network, a first offer to the employer for a real-time connection with the candidate. The method can include receiving, prior to the end of the video interview, an employer acceptance of the first offer for a real-time connection with the candidate. The method can include after receiving the employer acceptance, sending, over the communication network, prior to the end of the video interview, a second offer to the candidate for a real-time connection with the employer. The method can include receiving a candidate acceptance from the candidate of the second offer for a real-time connection with the employer, and after receiving the candidate acceptance, connecting the candidate and the employer in real time by establishing a live audio connection or a live audio and video connection.

In an embodiment, the textual video interview data fulfills real-time connection criteria data that is not fulfilled by the background data.

In an embodiment, the method can include during a first time window, saving a first portion of candidate data and a second portion of candidate data in a raw database on the system server, wherein the first portion of candidate data is related to a first real-time connection attribute and the second portion of the candidate data is related to a second real-time connection attribute, storing the first portion of candidate data within a first cell associated with the first real-time connection attribute in a candidate database, storing the second portion of candidate data within a second cell associated with the second real-time connection attribute in the candidate database, during a second time window later than the first time window, saving a third portion of candidate data and a fourth portion of candidate data in the raw database, wherein the third portion of candidate data is related to the first real-time connection attribute and the fourth portion of candidate data is related to the second real-time connection attribute, comparing the first portion of candidate data with the third portion of candidate data to determine which is more favorable for satisfying the first real-time connection attribute, as a result of determining that the first portion of candidate data is more favorable, maintaining the first portion of candidate data in the first cell, comparing the second portion of candidate data with the fourth portion of candidate data to determine which is more favorable for satisfying the second real-time connection attribute, and as a result of determining that the fourth portion of candidate data is more favorable, replacing the second portion of candidate data with the fourth portion of candidate data in the second cell.

In an embodiment, the booth further includes a user interface configured to display prompts to the candidate for asking the candidate to speak and provide audio data and video data, the method further can include storing, at a system server, a first frame of prompts can include at least a first prompt and a second prompt, displaying the first prompt and second prompt to the candidate, wherein the step of recording audio data and video data of the candidate includes recording the candidate's responses to the first prompt and second prompt in the video interview, wherein a third prompt is displayed after the second prompt, wherein a decision to display a third prompt is based on textual video interview data received in response to the one of the first or second prompt.

In an embodiment, the first frame of prompts is associated with an industry of the job opening, the method further can include: receiving, at a system server, a second frame of prompts can include at least a fourth prompt and a fifth prompt, wherein the second frame of prompts is associated with the employer, receiving, at a system server, after receiving the criteria data, a third frame of prompts can include at least a sixth prompt and a seventh prompt, wherein the third frame of prompts is associated with the job opening, and displaying the fourth prompt, fifth prompt, and sixth prompt to the candidate, wherein the step of recording audio data and video data of the candidate includes recording the candidate's responses to the fourth prompt, fifth prompt, and sixth prompt in the video interview.

In an embodiment, the method can include prompting, via a first candidate interface, the candidate to talk more about an aspect of the textual video interview data in response to analysis of the textual video interview information.

In an embodiment, the threshold amount is a percentage of the real-time connection attributes being met.

In an embodiment, the method can further include eliminating a real-time connection attribute upon determining the candidate's experience level is above a threshold experience level.

In an embodiment, the method can further include reducing the threshold amount of real-time connection attributes upon determining the candidate's experience level is above a threshold experience level.

In an embodiment, the method can further include eliminating a real-time connection attribute from the criteria data upon determining the presence of a skill that fulfills a different real-time connection attribute.

In an embodiment, the method can further include reducing the threshold amount of real-time connection attributes upon determining the presence of a skill that fulfills a real-time connection attribute.

In an embodiment, the method can include analyzing the textual video interview data with a salary analysis module, based on the analysis of the salary analysis module, generating a predicted salary range for the candidate, and providing the predicted salary range to the candidate at the end of the video interview.

In an embodiment, a method of connecting an employer with a candidate, is provided. The method can include receiving, at a system server, criteria data from the employer regarding a job opening, wherein the criteria data from the employer includes minimum attributes and real-time connection attributes. The method can include receiving, at the system server, background data from the candidate. The method can include recording audio data and video data of the candidate in a video interview of the candidate in a booth with a first camera, a second camera, and a microphone. The method can include recording behavioral data of the candidate with at least one depth sensor disposed in the booth. The method can include analyzing prior to an end of the video interview, at the system server, the audio data of the candidate with speech-to-text analysis to identify textual interview data, wherein candidate data includes the textual interview data and the background data. The method can include analyzing prior to the end of the video interview, at the system server, the behavioral data of the candidate to identify behavioral interview data, wherein the candidate data further includes the behavioral data. The method can include comparing the minimum attributes to the candidate data to determine if the minimum attributes are satisfied by the candidate data, if the minimum attributes are present in the candidate data, then comparing the real-time connection attributes to the candidate data to determine if a threshold amount of the real-time connection attributes are satisfied by the candidate data, sending, over a communication network, an offer to the employer for a real-time connection with the candidate if the threshold amount of real-time connection attributes are satisfied by the candidate data, and after the employer accepts the offer for a real-time connection with the candidate. The method can include sending, over the communication network, an offer to the candidate for the real-time connection with the employer, and connecting the candidate and the employer in real time, if the candidate accepts the offer for a real-time connection by establishing a live audio connection or a live audio and video connection.

In an embodiment, a conclusion relating the textual interview data with the behavioral data fulfills a real-time connection attribute.

In an embodiment, the conclusion includes a level of excitement, engagement, or enthusiasm about a discussed subject matter.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
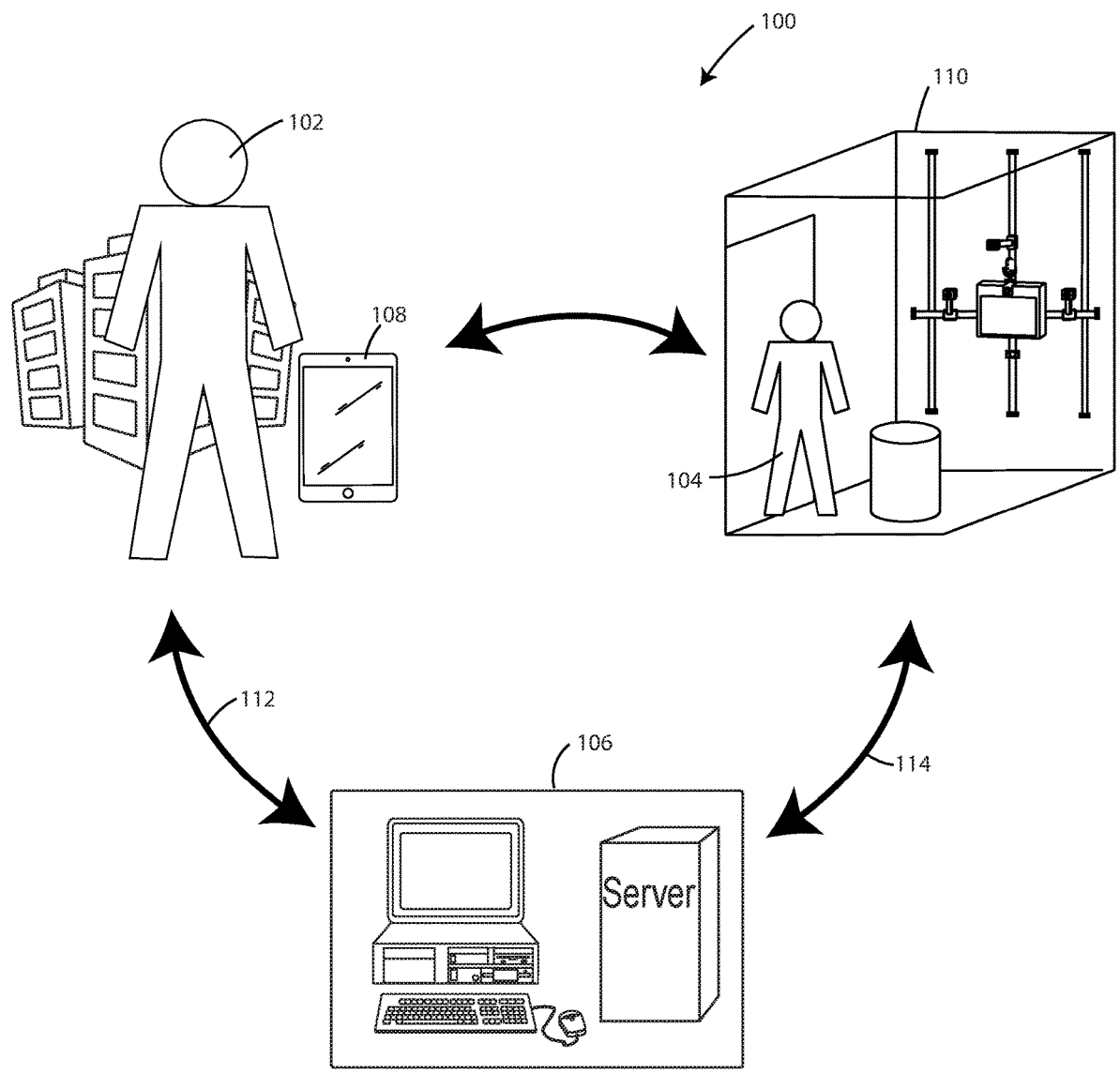
FIG. 1 is a schematic view of a connection system in accordance with various embodiments herein.

While embodiments are susceptible to various modifications and alternative forms, specifics thereof have been shown by way of example and drawings and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

In various embodiments, login entities are identified as authenticated users of a computerized system operating over a computer network. One login entity is subject to analysis based on the monitored activities of that login entity. The analysis can include the analysis of sensors that receive real-world data relating to an individual that initiated the connection to the system as the login entity. The sensors can receive three-dimensional spatial data related to the individual, and/or visual data received from cameras monitoring the individual. The analysis can also include electronic communications received from the login entity over the computer network, including textual inputs and vocal inputs. The system analyzes the sensor and electronic communications input to identify traits. The traits are then assigned to that login entity into a database managed by the system. The traits can include data elements pre-assigned to the login entity before the current session of the login entity on the computer system. The live session of the login entity allows the computer system to analyze the sensor data and electronic communications and to assign additional traits into the database system. If the traits in the database system for the login entity exceed a threshold only as a result of the new traits added by the live session analysis, a live communication is attempted between the analyzed login entity and a second login entity that is then communicated with the system over the computer network.

Various embodiments herein provide systems and methods for matching a highly qualified candidate (operating as a first login entity on the computer system) with an employer (a second login entity) in real time, while both parties are available. In these embodiments, upon establishing that a highly-qualified or desirable candidate is available and interested in a job opening, the system connects the two parties in real time over the computer network. In at least one embodiment, the connection provides for an interview process over the computer network. The establishment of the candidate as highly qualified can be accomplished by monitoring the sensor data and/or electronic communications during a live session of the candidate and combining newly assigned traits with existing database data accessed by the computer system. Further, the system is able to learn data about the candidate that is not able to be learned from a resume or other document. The system can learn the skills and traits of the candidate through responses to prompts via analysis of sensor data and electronic communications data.

In various embodiments, the employer can establish data defining one or more job openings that they wish to hire for. Prior to individuals accessing the system, the employer establishes data details in the system such as title and description. In many examples, the system defines additional criteria data regarding the job opening. Criteria data can define the skills or attributes that the employer wants a prospective candidate to have. Various embodiments can split the criteria data into two or more categories, such as minimum attributes and real-time connection attributes. The minimum attributes can be general traits or skills that candidate needs to have for the open position. Real-time connection attributes can define what attributes are associated with a top-tier candidate.

The provided systems and methods can include a candidate providing information about themselves that is stored in the databases of the system. This information can be divided into background data and content data. The system can analyze data from a video interview in real time, as the data is being provided to the system. The system can compare the information derived from the analyzed data with the criteria data from the employer. Upon reaching a threshold amount of similarities between the derived candidate data and the criteria data, the system can immediately notify the employer that a top-tier candidate is currently available and interested in the job opening or a related job opening. In some embodiments, the employer must be directly accessible by the system, such as by being logged into the system or by providing direct communication link between the system and the employer. If the employer is available and accepts the invitation to connect with the candidate, the system can ask the candidate if they want to connect with the employer to discuss the job opening at the moment. If the candidate also accepts, the systems provided herein can connect the two parties in real time. Connecting the two parties in real time, while the candidate is available, can substantially speed up the interview and hiring process. Further, connecting the parties in real time can also reduce the chances of a participating employer missing out on a top-tier candidate.

FIG. 1 shows a schematic view of a connection system 100 comprising an employer 102, a candidate 104, and a server 106 in accordance with various embodiments herein. In various embodiments, the connection system 100 can be implemented to match a top-tier prospective candidate 104 with an employer 102 that has a job opening of interest to the candidate 104 and connect the two parties in real time for live communication.

The system server 106 can request and/or receive 112 data from the employer 102 regarding a job opening. The data can be entered and/or sent using an employer's device 108, such as a computer or smart phone. The data includes criteria data, which is specific requirements or attributes that the employer 102 is searching for, such as experience, education, and skills. In some embodiments, the criteria data can include minimum attributes and real-time connection attributes, as discussed below in FIG. 3. The criteria data can be compared to data or information known about the candidate to determine if the candidate 104 is likely qualified and a good fit for the job opening.

The system server 106 can also request and/or receive 114 data from the candidate 104 regarding his/her employment qualifications, such as education, experience, certifications, and skills. This data can be compared to the criteria data to determine if the candidate 104 is likely qualified for the job opening.

The system 100 can include a kiosk or booth 110. The booth 110 can include one or more cameras, microphones, and depth sensors, as will be discussed below in reference to FIG. 2. A candidate 104 can be located within the booth 110. The candidate can identify and authenticate themselves to the server 106 as a login entity. The candidate 104 can participate in a video interview while in the booth. If the candidate 104 is determined to be a good fit for the job opening, the candidate 104 can be connected for live communication with the employer 102 while still in the booth 110.

In some embodiments, the candidate 104 can provide data, such as background data, to the system 100 prior to entering the booth. In some embodiments, the background data can be derived or recorded from the candidate's resume, a previous video interview, or another source. The booth 110 can provide prompts or questions to the candidate 104, through a user interface, for the candidate 104 to respond to. The candidate's response to each of the prompts can be recorded with the video cameras and microphones. The candidate's behavioral data can be recorded with a depth sensor.

Figure 4:
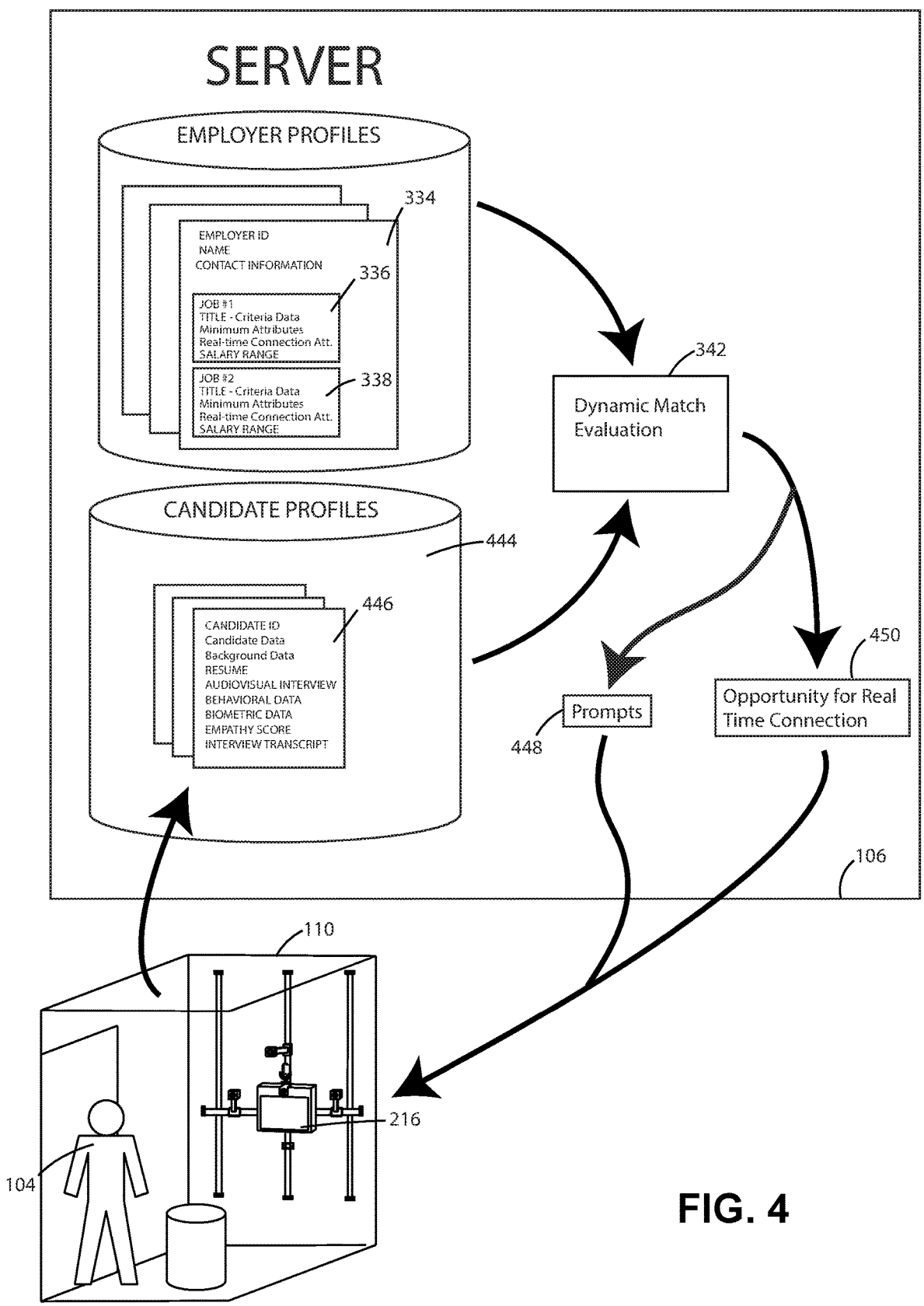
FIG. 4 is a schematic view of a portion of the data on the server in accordance with various embodiments herein.

The system server 106 can analyze, evaluate, and update the candidate's known information while the candidate 104 is participating in the video interview (FIG. 4). The server 106 can use speech to text analysis to determine the subject matter being discussed and word use of the candidate 104 during the video interview. During the analysis and evaluation of the candidate's information, the system 100 can compare the known candidate data to the criteria data provided by the employer 102 to determine if the candidate fulfills the minimum and/or real-time connection attributes that the employer 102 provided.

Figure 5:
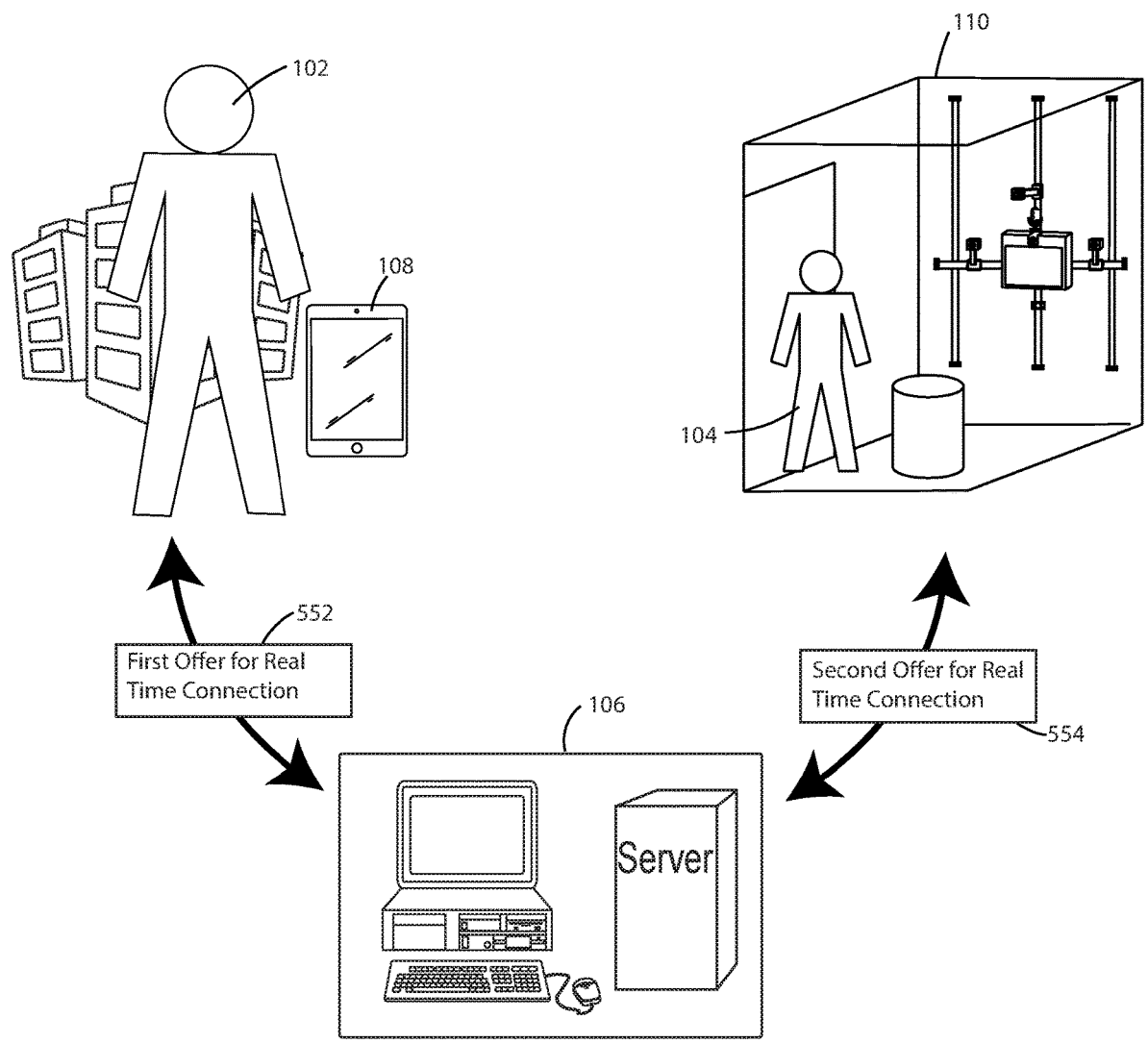
FIG. 5 is a schematic view of a connection system in accordance with various embodiments herein.
Figure 6:
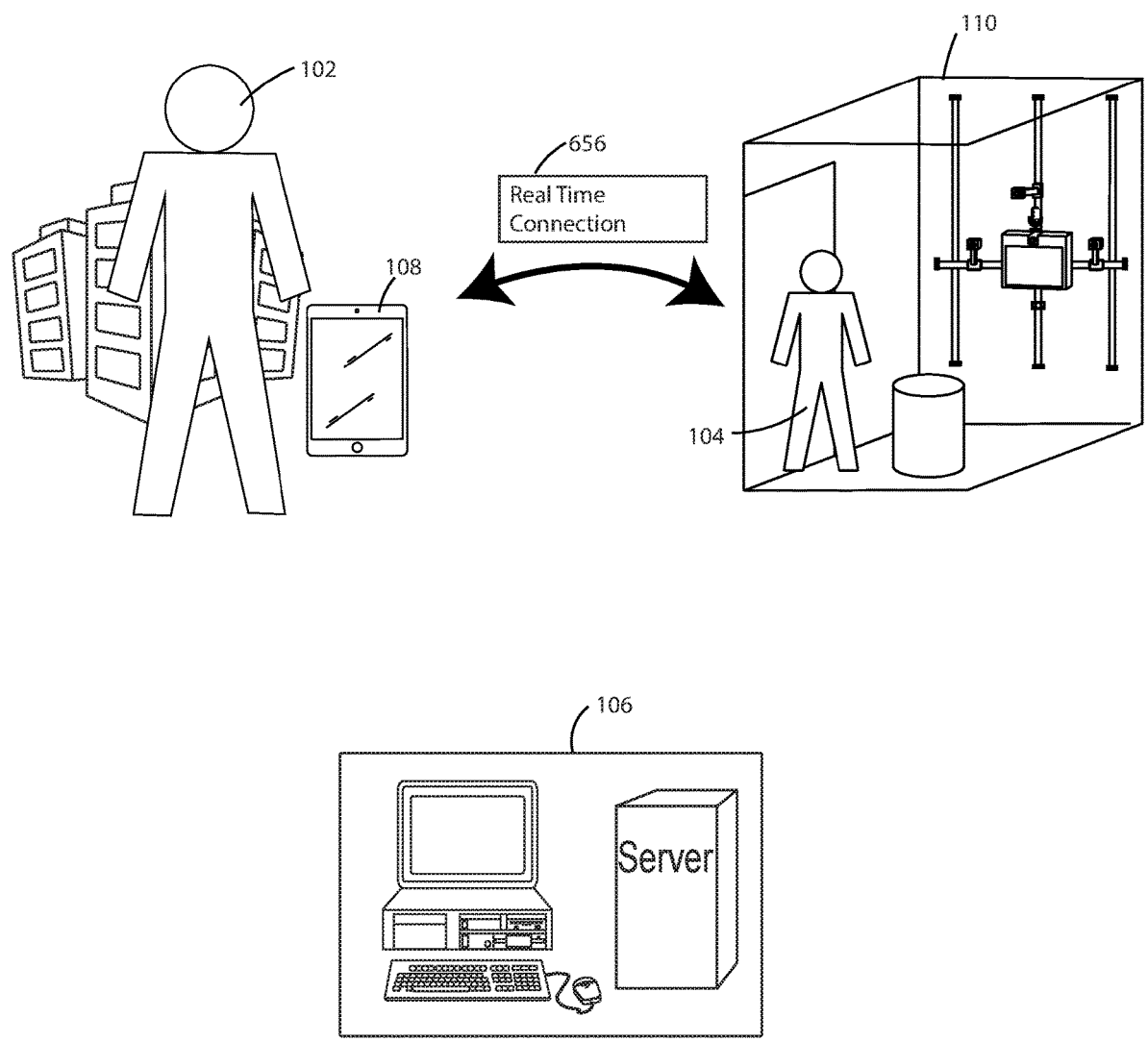
FIG. 6 is a schematic view of a connection system in accordance with various embodiments herein.

If there is a sufficient amount of overlap between the candidate data and the criteria data, and both parties are willing to connect with each other (FIG. 5), the system 100 will connect two parties in real time for live communication (FIG. 6).

Figure 2:
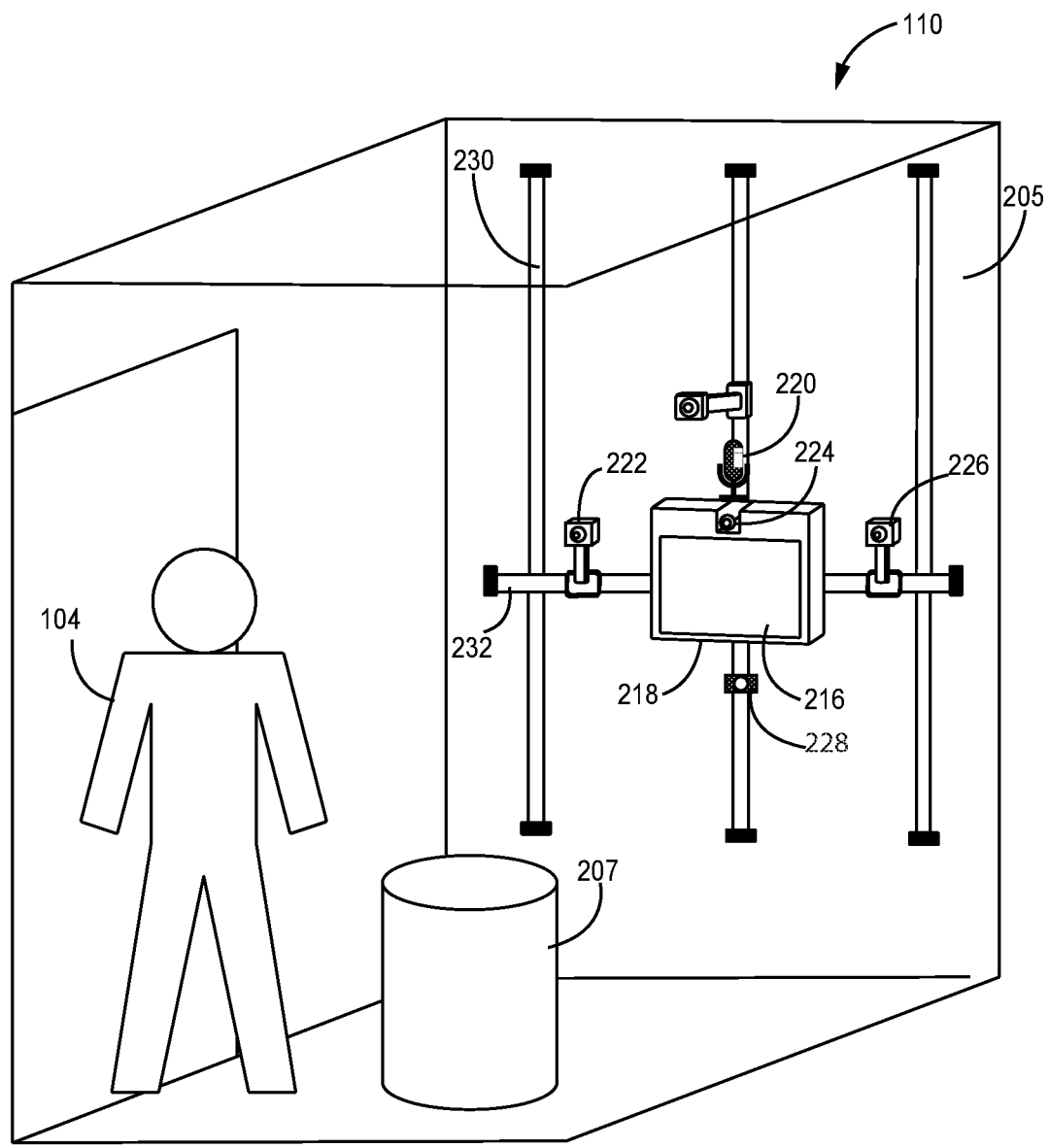
FIG. 2 is a schematic view of a booth in accordance with various embodiments herein.

Booth (FIG. 2)

In reference now to FIG. 2, a schematic view of a booth 110 or kiosk is shown in accordance with various embodiments herein. The booth 110 can be provide for recording a video interview of a party, such as an individual or job candidate 104. The candidate 104 can be positioned inside of the enclosed booth 205 while being recorded.

Optionally, a seat 207 can be provided for the candidate 104. The booth 110 houses multiple cameras, such as a first camera 222, a second camera 224, and a third camera 226. Each of the cameras is capable of recording video of the candidate 104 from different angles. In the embodiment of FIG. 2, the first camera 222 records the candidate 104 from the left side, the second camera 224 records the candidate 104 from the center, and the third camera 226 records the candidate 104 from the right side. In some examples, the camera 224 can be integrated into a user interface 216 on a tablet computer 218.

Instead of a tablet computer 218, a computer 218 can be used having the shape and size of a typical tablet computer. For example, computer 218 can be sized for easy movement and positioning by the user. In various embodiments, the computer 218 has a display screen size of at least about 5 inches, at least about 6 inches, at least about 7 inches, at most about 10 inches, at most about 12 inches, or a combination of these boundary conditions. In various embodiments, the computer 218 has a case depth of at least about 0.3 inch, at least about 0.4 inch, at most about 0.7 inch, at most about 1 inch, or a combination of these boundary conditions. A microphone 220 is provided for recording audio. In some examples, each camera 222, 224, 226 can include a microphone 220. In some embodiments, the microphones 220 are embedded into and form part of the same physical component as a camera 222, 224, 226. In other embodiments, one or more of the microphones 220 are separate components that can be mounted apart from the cameras within the kiosk 110.

The first, second, and third cameras 222, 224, 226 can be digital video cameras that record video in the visible spectrum using, for example, a CCD or CMOS image sensor. Optionally, the cameras can be provided with infrared sensors or other sensors to detect depth, movement, etc. In some examples, one or more depth sensors 228 can be included in the booth 110.

In some examples, the various pieces of hardware can be mounted to the walls of the enclosed booth 205 on a vertical support 230 and a horizontal support 232. The vertical support 230 can be used to adjust the vertical height of the cameras and user interface, and the horizontal support 232 can be used to adjust the angle of the cameras 222, 224, 226. In some examples, the cameras can automatically adjust to the vertical position along vertical supports 230, such as to position the cameras at a height that is not higher than 2 inches (5 centimeters) above the candidate's eye height. In some examples, the cameras can be adjusted to a height of no more than 52 inches (132 centimeters) or no more than 55 inches (140 centimeters).

The candidate 104 can participate in a recorded video interview while in the booth 110. The cameras 222, 224, 226, the depth sensor 228, and the microphone 220 can record video data, behavioral data, and audio data of the candidate 104 during the interview.

The user interface 216 can provide the candidate 104 with prompts during the video interview. The candidate 104 can respond to the prompts. The candidate's responses can be recorded. In some embodiments, the server 106 can be at least partially located at or within the booth 110. In other embodiments, the server 106 can be entirely or partially located at a remote location away from the booth 110 and the employer 102. Further examples of booth structures and hardware are described in U.S. patent application Ser. No. 16/828,578, titled "Multi-Camera Kiosk," filed on Mar. 24, 2020, which claims the benefit of U.S. Provisional Application No. 62/824,755, filed Mar. 27, 2019, which are incorporated by reference herein.

Figure 3:
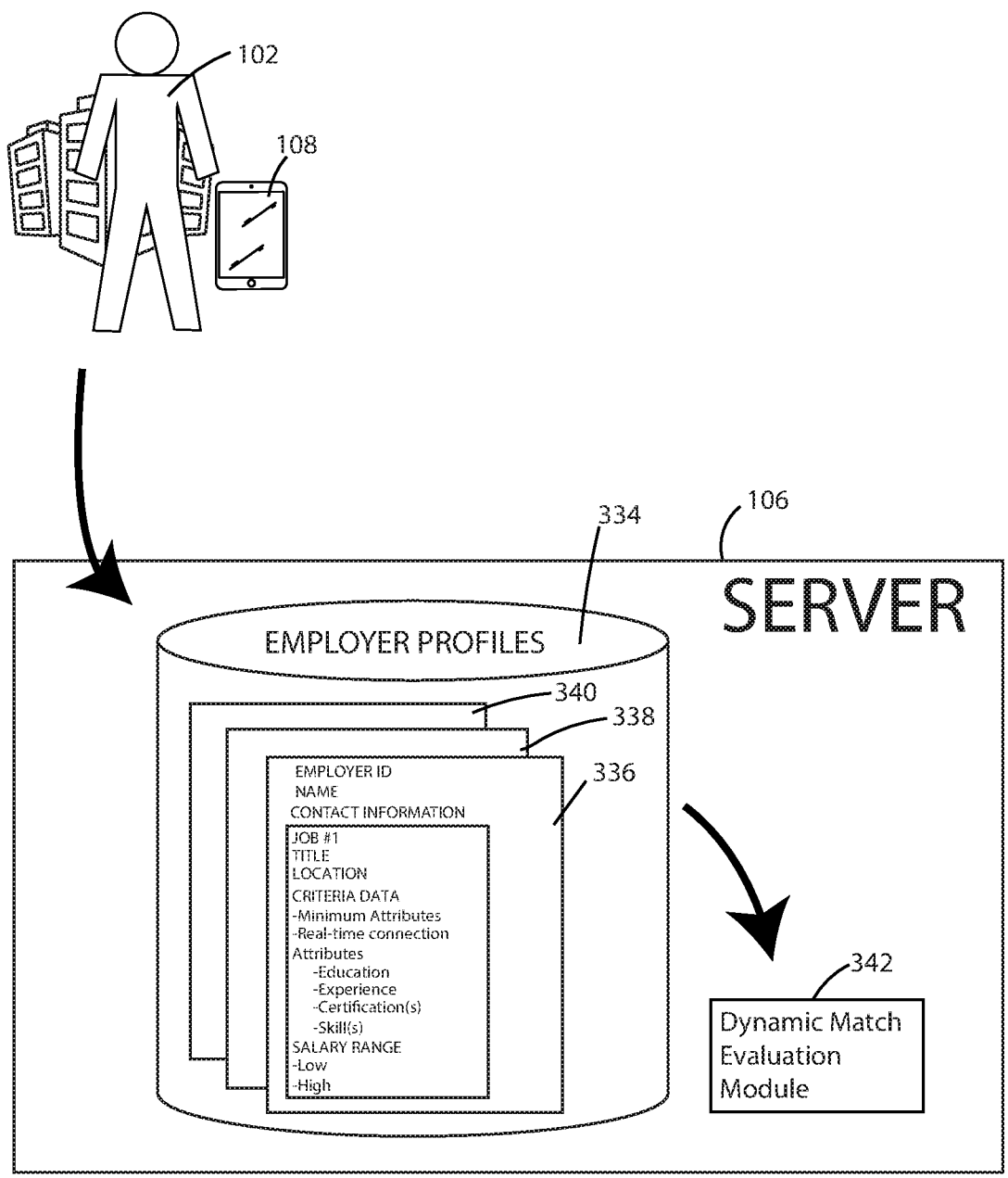
FIG. 3 is a schematic view of a portion of the data on the server in accordance with various embodiments herein.

Server and Data Storage (FIGS. 3-4)

FIG. 3 is a schematic view of a portion of the data on the server 106 in accordance with various embodiments herein. The server 106 can include various employer profiles in a database. For example, each employer 102 that is registered with the system 100 can have a unique employer profile 334. The employer profile 334 can include a job opening profile 336, 338, 340 for each job opening the employer 102 has hired for or is hiring for. Each job opening profile can include an identifying number, such as a unique identification number. Each job opening can further include various data, such as the title of the job, location of the job, job description, criteria data, and salary data.

In various embodiments, the criteria data can include skills, education, experience, certifications, and other attributes that the employer 102 is looking for in a candidate for the job opening. In some embodiments, the criteria data can include minimum attributes and real-time connection attributes. Minimum attributes can include attributes that the candidate needs to have to be qualified for the job. Real-time connection attributes can include attributes that an ideal candidate would have. For examples, a real-time connection attribute can require a rare skill, a rare personal quality, or a greater number of years of experience compared to a minimum attribute.

Data from a job opening profile can be analyzed and compared to data about the candidate 104 in a dynamic match evaluation module 342 on the server 106. The dynamic match evaluation module 342 can determine if the candidate 104 has the attributes to fulfill the minimum attributes, the real-time connection attributes, and/or a threshold amount of real-time connection attributes. If the candidate 104 is determined to have the minimum attributes and a sufficient number of real-time connection attributes to meet the threshold amount, the system 100 can propose connecting the employer 102 with the candidate 104 in real time.

FIG. 4 is a schematic view of a portion of the data on the server 106 in accordance with various embodiments herein. The candidate 104 can take part in a video interview while in the booth 110. For the video interview, the system 100 can provide prompts 448 to the candidate 104 through the user interface 216. The prompts can be questions or requests, such as "Describe your experience managing people," or "Tell us about a time you resolved a conflict within a team."

In some embodiments, one or more prompts can be part of a frame or set of prompts that specifically intended to draw out desired information from the candidate, such as discussed below in reference to FIG. 13. In some embodiments, a frame can be specific to an industry, an employer, or a job type. In some embodiments, one or more prompts can be adjusted or added based on information provided by the candidate 104 during the video interview. For example, the candidate might have mentioned that he/she has taken a certification test but has not yet received the results of the test. A prompt inquiring about when the test results will be available or a prompt asking the candidate 104 how he/she thinks the test went could be added to a frame or a set of frames.

As the candidate 104 is replying to prompts during the video interview, the system 100 can be recording the candidate's responses and actions. The microphone 220 can record what the candidate 104 is saying. The cameras 222, 224, 226 can record video of the interview, and the cameras, microphone, and depth sensor(s) 228 can record behavioral data of the candidate 104 during the interview. The data from these sources can be saved in a candidate profile 444 on the server 106.

Similar to the employer profiles 334, each candidate 104 can have a candidate profile 444 on the server. Each candidate profile 444 can include candidate data 446, such as a candidate identification number, name, contact information, background data, interview data, and the like. Background data can include data from the candidate's resume, previous video interviews, or other sources of already known data about the candidate 104. The candidate profile 444 can be updated throughout the video interview as the system learns and obtains more data about the candidate 104.

In some embodiments, the system server 106 can analyze interview data, such as audio data, of the candidate prior to the end of the video interview. The system 100 can analyze extract, or process the audio data with a speech-to-text module to identify textual video interview data. The candidate data 446 can include the textual video interview data. In some embodiments, the textual video interview data can include a transcript of the video interview, or at least a partial transcript of the video interview. In some embodiments, the system server 106 can analyze various data sources from a candidate's video interview to extract interview data, such as to extract behavioral interview data from behavioral data or to extract textual interview data from audio data.

Data from the candidate profile 444 can be compared and evaluated with data from employer profile 334 in the dynamic match evaluation module 342. The dynamic match evaluation module 342 can compare the minimum attributes of the job opening to the candidate data to determine if the minimum attributes are satisfied by the candidate data. In some embodiments, the minimum attributes are determined to be satisfied before the real-time connection attributes are analyzed. In some embodiments, if the minimum attributes are present in the candidate data, the dynamic match evaluation module 342 can compare the real-time connection attributes to the candidate data to determine if a threshold amount of the real-time connection attributes are satisfied by the candidate data. In some embodiments, the textual video interview data fulfills one or more real-time connection attributes that is not fulfilled by the background data.

In various embodiments, if it is unknown whether or not the candidate has a specific attribute after the candidate's response to a prompt intended to draw out that attribute, the system 100 can further prompt 448 the candidate to discuss or talk more about an aspect of the textual video interview data, such as in response to analysis of the textual video interview information being determined as incomplete.

In one example, the system stores a prompt table related to a specific attribute, and the prompt table stores multiple prompts that are designed to elicit information to satisfy the specific attribute. The prompt table defines if-then relationships between a particular answer that is received and the next prompt that is provided based on that answer. Alternatively, the questions can take the form of a flow chart of questions or a question tree. When the first prompt is answered, the answer is analyzed and a branch of the tree (or the next step in the flow chart) is taken to select the next prompt to be presented. Ideally, the result of following such a question tree is to assign a value to an attribute associated with the candidate. Such an attribute value can be an important or determinative factor in the dynamic match evaluation engine 342 making a determination to establish a real-time connection. The attribute values for a particular candidate are part of the candidate data for that candidate.

If a threshold amount of real-time connection attributes is met, the system can offer the employer 102 and candidate 104 the opportunity for a real-time connection 450.

Real-Time Connection System (FIGS. 5-8)

In reference now to FIG. 5, a schematic view of the connection system offering real-time connection is shown in accordance with various embodiments herein. In some embodiments, prior to sending an offer to the employer or to the candidate for a connection in real time, the system can check to see if the parties are prequalified for a real-time connection. Method steps of the system, the candidate and the employer related to prequalification for a real-time connection are further discussed in reference to FIGS. 17-20.

If the threshold amount of real-time connection attributes is fulfilled, the system 100 can send a first offer 552 to the employer 102 to connect to the candidate 104. In various embodiments, the identity of the candidate can be unknown to the employer 102, such that identification information can be withheld or not included in the offer 552. In some embodiments, an explanation of why the candidate 104 qualified for the real-time connection can be provided with the offer 552, such as informing the employer 102 that the candidate possesses a desired certification or skill.

The system can receive the employer's 102 acceptance of the offer 552 prior to the end of the video interview. In many embodiments, the video interview can continue while the offer 552 is sent and the system is waiting for a response from the employer 102. In some embodiments, the candidate 104 is not informed that an offer for real-time connection with an employer 102 has been sent.

After receiving the employer's acceptance, a second offer 554 for a real-time connection can be sent, such as over the communication network or on the user interface 216, this time to the candidate 104. If the candidate 104 also accepts the offer, the server 106 can establish a network connection 656 between the candidate 104 and the employer 102 as shown in FIG. 6. The connection can be a live audio connection such as a telephone connection, or the connection can be a live audio and video connection.

Figure 7:
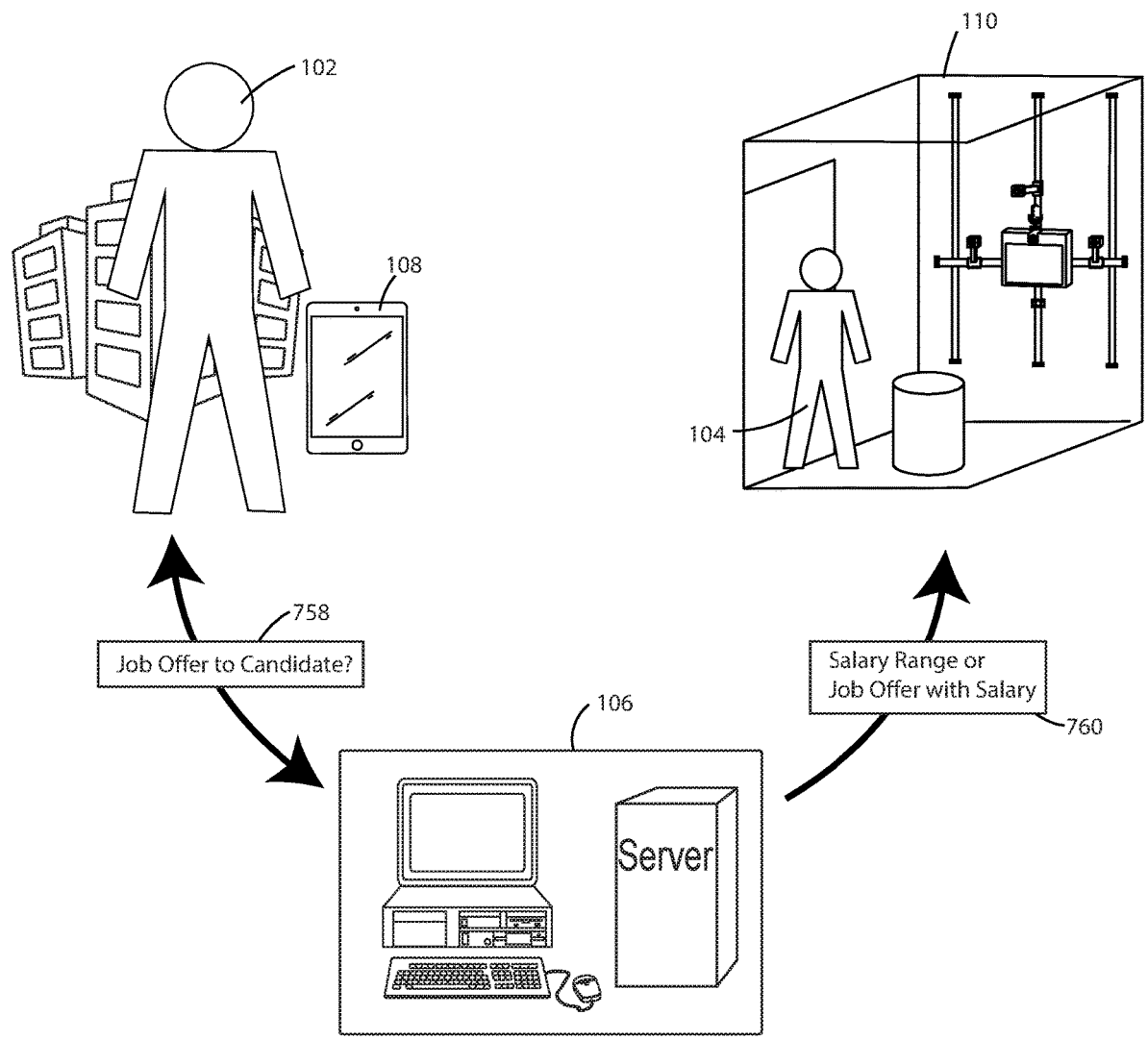
FIG. 7 is a schematic view of a connection system in accordance with various embodiments herein.

Now referring to FIG. 7, after the real-time connection between the employer 102 and the candidate 104 has ended, the system 100 can conduct certain activities to gather data about the live communications conducted during the real-time connection and based on the analysis conducted leading up to and during the real-time connection. An inquiry 758 is sent to the employer 102, asking whether the employer 102 would like to offer or has offered the job to the candidate 104 as shown in FIG. 7. If the employer 102 intends to send a job offer to the candidate 104, the system 100 can send a job offer 760 to the candidate 104.

If the employer 102 does not intend to send a job offer to the candidate 104, the system 100 can still send information that is helpful to the candidate 104, such as sending an expected salary range 760 to the candidate 104. The expected salary range can be an output from a salary analysis module. Inputs to the salary analysis module include the candidate data and market data. The market data can include government-published and industry-group published data for the particular job opening or other job openings that might fit the candidate's skills. The market data can also include internal market data that is not publicly available but is available within or to the system because of the many job openings posted in the system, many of which will include salary ranges, and past employee job offers extended using the system.

The internal market data includes geography information. It is also possible that the public market data can include geography information. Information regarding geographic salary differences relevant to the candidate and the job opening can be included in the output from the salary module. The system can decide what geographic salary ranges to present to the candidate based on candidate data, such as interview data collected by speech-to-text modules during the interview and by sensors during the video interview. For example, interview data can include that a candidate expresses a strong interest in working in a first geographic area and a tentative interest in working in a higher-demand, second geographic location. The output from the salary analysis module can include data related to both the first and second geographic areas. The output from the salary analysis module can include a differential income boost predicted from job searching in the second geographic area compared to the first geographic area.

The candidate data from the just-completed real-time interview and preceding video interview, as well as any candidate background data, can be used as input to the salary analysis module. As a result, the candidate leaves the video interview process with up-to-date detailed, valuable information. The candidate is more likely to invest time performing a video interview with a system that provides the candidate with helpful information. The candidate is also more likely to invest time with a system that guides the candidate to higher-value job opportunities.

Figure 8:
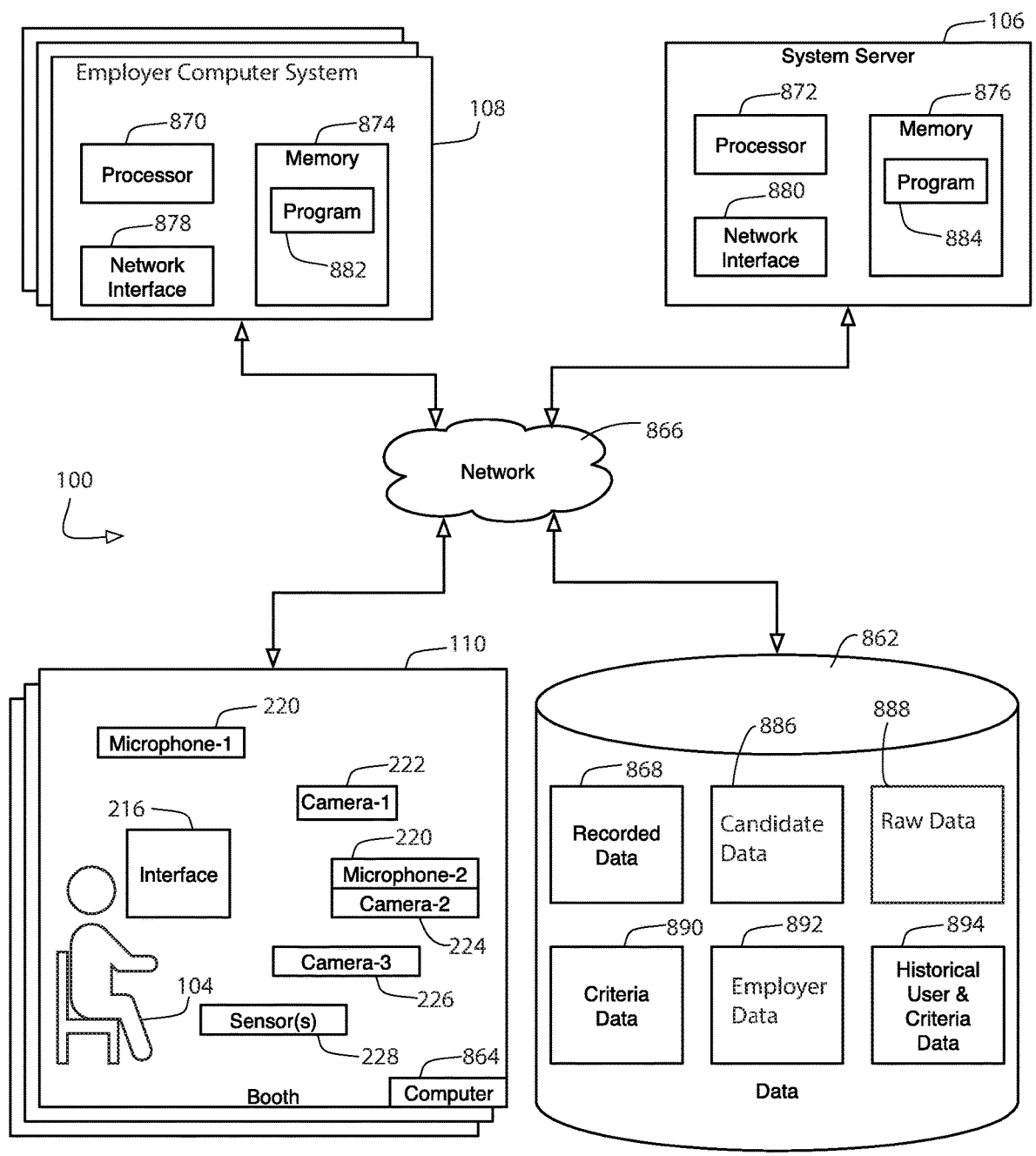
FIG. 8 is a schematic view of various components in the connection system in accordance with various embodiments herein.

FIG. 8 is a schematic view of various components in the connection system 100 in accordance with various embodiments herein. FIG. 8 shows the system 100 that records the activity of the candidate 104 within the booth 110 in order to gather data for determining the candidate's fit for a job opening. Data recorded from the booth 110 can be managed in part by the system server 106 and stored in data store 862. In some embodiments, the system server 106 allows multiple employer computer systems 108 to access data 862 from multiple booths 110, although the following discussion will primarily focus on the interaction between a single booth 110 and a single employer computer system 108.

As discussed above, the booth 110 can include an enclosed room that records high-quality audio and visual data of candidate 104. The booth 110 houses multiple visual cameras, including a first camera 222, a second camera 224, and a third camera 226. The booth 110 also houses at least one microphone 220 for recording audio. In FIG. 8, two microphones 220 are shown in the booth 110. The sound data from the microphones 220 can be combined with the visual data from the cameras 222, 224, 226 into video (audio plus visual) material for either for immediate analysis or for later review of the candidate's recording session within the booth.

The sound recorded by the microphones 220 can also be used for behavioral analysis of the candidate 104. Speech recorded by the microphones 220 can be analyzed to extract behavioral data, such as vocal pitch and vocal tone, speech cadence, word patterns, word frequencies, total time spent speaking, and other information conveyed in the speaker's voice and speech.

The booth 110 can also incorporate one or more depth sensors 228 that can detect changes in the position of the candidate 104. Only one depth sensor 228 is shown in FIG. 8, but some embodiments will utilize multiple depth sensors 228 aimed at different portions of the candidate 104. The depth sensors 228 can utilize one or more known technologies that are able to record the position and movement of the candidate 104, such as stereoscopic optical depth sensor technology, infrared sensors, laser sensors, or even LIDAR sensors. These sensors 228 generate information about the facial expression, body movement, body posture, and hand gestures of candidate 104. Depth sensors 228 can also be referred to as behavioral sensors, and data from these sensors 228 can be combined with information obtained from visual cameras 222, 224, 226 and microphones 220 to provide detailed behavioral data concerning the candidate 104. This information can then be used to extrapolate information about the candidate's emotional state during the video interview in the booth 110, such as whether the candidate 104 was calm or nervous, or whether the candidate 104 was speaking passionately about a particular subject. This data can be used to fulfill or meet one or more of the criteria data attributes.

A computer 864 at the booth 110 is able to capture visual data of the candidate 104 from the cameras, capture audio data of the candidate 104 from the microphones, and capture behavioral data input from the depth sensors. This data is all synchronized or aligned. This means, for example, that audio information recorded by all of the microphones 220 can be synchronized with the visual information recorded by all of the cameras 222, 224, 226 and the behavioral data taken from the sensors 228, so that all the data taken at the same time can be identified and compared for the same time segment.

The computer 864 is a computing device that includes a processor for processing computer programming instructions. In most cases, the processor is a CPU, such as the CPU devices created by Intel Corporation (Santa Clara, Calif.), Advanced Micro Devices, Inc. (Santa Clara, Calif.), or a RISC processer produced according to the designs of Arm Holdings PLC (Cambridge, England). Furthermore, computer 864 has memory, which generally takes the form of both temporary, random access memory (RAM) and more permanent storage such a magnetic disk storage, FLASH memory, or another non-transitory (also referred to as permanent) storage medium. The memory and storage (referred to collectively as "memory") contain both programming instructions and data. In practice, both programming and data will be stored permanently on non-transitory storage devices and transferred into RAM when needed for processing or analysis. In some embodiments, the computer 864 may include a graphics processing unit (or GPU) for enhanced processing of visual input and outputs, or an audio processing board, a single chip audio processor, or a digital signal processor (or DSP) that accelerates the processing of audio inputs and outputs.

It should be understood that the receiving, processing, analyzing, and storage of data can take place at the computer 864 in the booth 110 or at a remote server, such as system server 106. Discussion of the steps taken with data can be understood to apply to both the computer 864 and the server 106.

In some embodiments, the computer 864 is tasked with receiving the raw visual data from the cameras, the raw audio data from the microphones, and the raw sensor data from the behavioral depth sensors. The computer 864 is also tasked with making sure that this data is safely stored. The data can be stored locally, or it can be stored remotely. In FIG. 8, the data is stored in data store (also referred to as data or database) 862. This database 862 can include defined database entities that may constitute database tables in a relational database. In other embodiments, these entities constitute database objects or any other type of database entity usable with a computerized database. In the present embodiment, the phrase database entity refers to data records in a database whether comprising a row in a database table, an instantiation of a database object, or any other populated database entity. Data within this database 862 can be "associated" with other data. This association can be implemented in a variety of techniques depending on the technology used to store and manage the database, such as through formal relationships in a relational database or through established relationships between objects in an object-oriented database.

Although this database 862 is showed as being connected to the booth 110 over network 866, this data 862 can be stored locally to the booth 110 and computer 864. To save storage space, audio and video compression formats can be utilized when storing data 862. These can include, but are not limited to, H.264, AVC, MPEG-4 Video, MP3, AAC, ALAC, and Windows Media Audio. Note that many of the video formats encode both visual and audio data. To the extent the microphones 220 are integrated into the cameras, the received audio and video data from a single integrated device can be stored as a single file. However, in some embodiments, audio data is stored separately the video data. Nonetheless, FIG. 8 shows audio, visual, and sensor data being combined as a single recorded data element 868 in data store 862.

Recorded data 868 can be processed and saved as candidate data 886. Candidate data 886 can include recorded data specific to the candidate 104. Candidate data 886 can further include background data of the candidate 104, such as resume information or personally identifying information.

The computer 864 is generally responsible for coordinating the various elements of the booth 110. For instance, the computer 864 is able to provide visual instructions or prompts to a candidate 104 through one or more interfaces 216 that are visible to the candidate 104 when using the booth 110. Furthermore, audio instructions can be provided to the candidate 104 either through speakers (not shown) integrated into the booth 110 or through earpieces or headphones (also not shown) worn by the candidate 104. In addition, the computer 864 can be responsible for receiving input data from the user, such as through a touchpad integrated into interface 216.

The system 100 shown in FIG. 8 also includes an employer computer system 108 and a system server 106. These elements 108, 106 are also computer systems, so they may take the same form as computer 864 described above. More particularly, these computing systems 108, 106 will each include a processor 870, 872, memory and/or storage 874, 876, and a network interface 878, 880 to allow communications over network 866. The memory 874, 876 is shown in FIG. 8 as containing computer programming 882, 884 that controls the processor 870, 872.

In FIG. 8, the system server 106 is represented as a single computing device. Nonetheless, it is expected that some embodiments will implement the system server 106 over multiple computing devices all operating together through common programming as a single system server 106.

In some embodiments, the employer computer system 108 takes the form of a mobile device such as a smartphone or tablet computer. If the employer computer 108 is a standard computer system, it will operate custom application software or browser software 882 that allows it to communicate over the network 866 as part of the system 100. In particular, the programming 882 can at least allow communication with the system server 106 over the network 866. The system 100 can also be designed to allow direct communication between the employer's computer system 108 and the booth's computer 864, such as for the real-time connection, or even between the employer computer system 108 and data 862. If the employer computer 108 is a mobile device, it will operate either a custom app or a browser app 882 that achieves the same communication over network 866. This network 866 can allow a user using employer computer system 108 to connect directly with the booth's computer 864, such as for a real-time connection between the employer 102 and the candidate 104.

Note that even though FIG. 8 shows that recorded data 868 and candidate data 886 are found in the same data store 862, there is no need for all the data 862 to be physically or logically stored in a single structure. FIG. 8 merely schematically groups data 862 into a single element for ease in understanding the system. Nonetheless, relationships between certain types of data 862 will drive the systems and methods described below, so it will be necessary to analyze and compare much of the data 862 shown with other data 862.

Database 862 also contains criteria data 890. Criteria data 890 constitutes information that is of interest to the employer 102 and is relevant to the data 868 acquired by the booth 110. In the context of an employment search, the criteria data 890 may containing various attributes and experience requirements for the job opening.

Database 862 also includes information or data 892 about the employer 102. This information can be used to help a candidate decide if he/she wants to accept a real-time communication with an employer. Finally, the database 862 maintains historical information 894 about previous criteria data 890 (such as data about previous job openings) and previous actions by candidates or employers.

An employer using one of the employer computer systems 108 will authenticate themselves to the system server 106. One method of authentication is the use of a username and password. This authentication information, or login information, can be stored in the memory 874 of the employer computer system 108 so that it does not need to be entered every time that the employer interacts with the system 100. The system server 106 can identify a particular employer as an employer login entity accessing the system 100. Similarly, a candidate using the booth 110 will also authenticate themselves to the system 100, such as through the use of their own username and password. In this way, the connection between an employer using an employer computer system 108 and a candidate 104 using a booth can be considered a connection made by the server 106 between two different login entities to the system 100.

Figure 9:
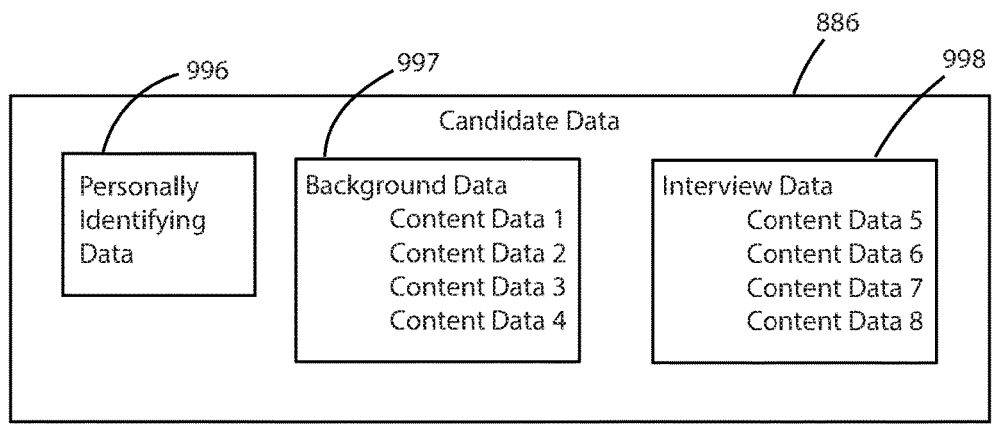
FIG. 9 is a schematic view of candidate data in accordance with various embodiments herein.

Candidate Data (FIG. 9)

Information about the candidate 104 can be stored in the data store 862 as candidate data 886. As shown in FIG. 9, this candidate data 886 can contain personally identifying information 996, such as the name of and the contact information for the candidate 104. The personally identifying information 996 is withheld or not included in the request sent to the employer computer system 108 for a real-time connection, such that the identity of the candidate would remain unknown to the employer 102 until the employer 102 agrees to the real-time connection and is connected with the candidate 104. The personally identifying data is not used in evaluating the possibility of a real-time connection and is not provided to the employer with the offer for a real-time connection. Instead, unique identifiers are used to identify the candidate 104. Personal information is preferably saved remote from the booth for more secure storage, such as at a system server 106.

The candidate data can further include background data 997 and interview data 998. As previously mentioned, the background data 997 can be derived or recorded from the candidate's resume, a previous video interview, or another source prior to a particular video interview starting. Interview data 998 can include data that was recorded during the particular video interview, that is, a video interview that is currently happening. Attribute data for the candidate that is identified for specific content and helps determine if a particular attribute is met by a candidate, such as years of experience, skills, empathy score, other types of candidate scores, and certifications can be referred to as content data, as shown in FIG. 9.

Figure 10:
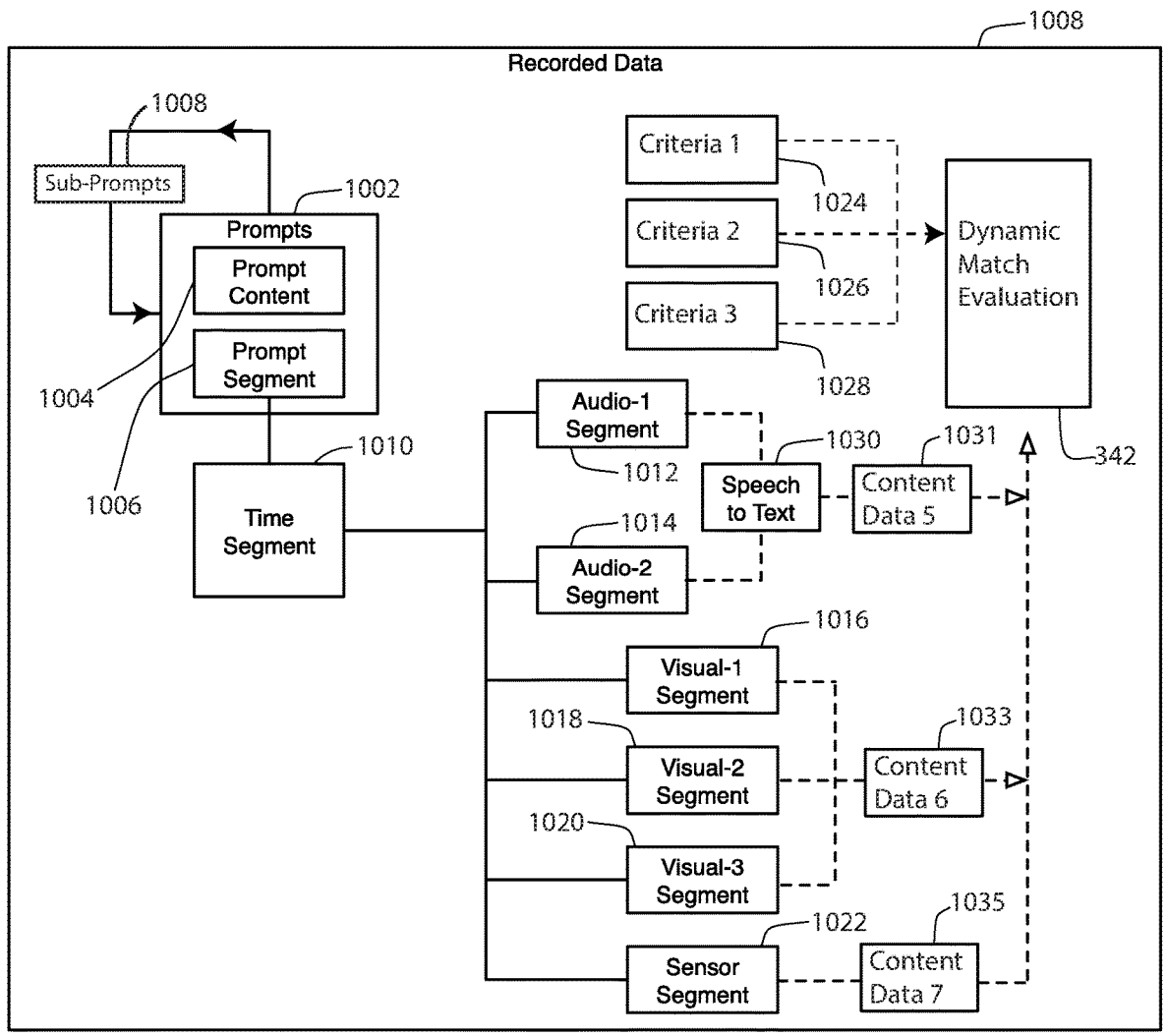
FIG. 10 is a schematic view of recorded data in accordance with various embodiments herein.

Recorded Data (FIG. 10)

FIG. 10 shows details about the recorded data 868 that is maintained about a recorded session of the candidate 104 at the booth 110 in accordance with various embodiments. Part of this information is the content 1004 and timing 1006 of prompts 1002, which are the instructions that were provided to the candidate 104 during the video interview. These instructions can take a variety of forms depending on the type of session that is being recorded for the candidate 104. In some embodiments, to begin the interview, the candidate 104 sits on a seat in front of the cameras, microphones, and depth sensors. The height and position of each of the cameras and the depth sensors may be adjusted to optimally capture the recorded data 868. Prompts (usually instructions or questions) are provided to the candidate 104, either audibly or through the visual interface screen 216 (or both). For example, in the context of an automated interview for a medical job, the prompts might include:

1) Why did you choose to work in your healthcare role?
2) What are three words that others would use to describe your work and why?
3) How do you try to create a great experience for your patients?
4) How do you handle stressful work situations?
5) What would it take for you to move somewhere else for a job (Salary, location, organization, etc.)
6) What is your dream job in healthcare?
7) Tell us about a time you used a specific clinical skill in an urgent situation (describe the situation and skill).
8) What area of medicine do you consider yourself a specialist in? Why?

The prompt data 1002 contains information about the content 1004 of each prompt given during the recorded session of the candidate 104. In addition, the prompt data 1002 contains prompt segment information 1006 about the timing of these prompts. The timing of these prompts 1006 can be tracked in a variety of ways, such as in the form of minutes and seconds from the beginning of a recorded session. For instance, a first prompt may have been given to the candidate 104 at a time of 1 minute, 15 seconds (1:15) from the beginning of the recorded session. Note that this time may represent the time at which the first prompt was initiated (when the screen showing the prompt was first shown to the candidate 104 or when the audio containing the prompt began). Alternatively, this time may represent the time at which the prompt was finished (when the audio finished) or when the user first began to respond to the prompt. A second prompt may have been given to the candidate 104 at a time of 4 minutes, 2 seconds (4:02), the third prompt at 6 minutes, 48 seconds (6:48), etc. The time between prompts can be considered the prompt segment 1006. The prompt segment 1006 may constitute the time from the beginning of one prompt to the beginning of the next prompt, or from a time that a first prompt was finished to a time just before the beginning of a second prompt. This allows some embodiments to define the prompt segments 1006 to include the time during which the prompt was given to the candidate 104, while other embodiments define the prompt segments 1006 to include only the time during which the individual responded to the prompt. Regardless of these details, the prompt data 1002 contains the timing information necessary to define prompt segments 1006 for each prompt 1002.

Prompt data 1002 in data store 862 includes the text or audio of the instructions provided to the individual (or an identifier that uniquely identifies that content) and the timing information needed to define the prompt segments 1006.

In some contexts, prompts 1002 can be broad, general questions or instructions that are always provided to all candidates 104 (or at least to all candidate 104 that are using the booth 110 for the same purpose, such as applying for a particular job or type of job). In other contexts, the computer 864 can analyze the individual's response to the prompts 1002 to determine whether additional or follow up prompts 1002 should be given to the candidate 104 on the same topic. For instance, an individual looking for employment may indicate in response to a prompt that they have experience with data storage architecture. This particular technology may be of interest to current employers that are looking to hire employees in this area, such that it might fulfill a minimum attribute. However, this potential employer may want to hire an employee only with expertise in a particular sub-specialty relating to data storage architecture (a real-time connection attribute). The computer 864 may analyze the response of the candidate 104 in real time using speech-to-text technology and then determine that additional prompts 1002 on this same topic are required in order to learn more about the technical expertise of the candidate 104 compared to the criteria data 890. These related prompts 1008 can be considered "sub-prompts" of the original inquiry. In FIG. 10, it is seen that prompts 1002 can be related to other prompts 1002 by being connecting through sub-prompt links 1008. These sub-prompts can be treated like any other prompt 1002 by system 100, but their status as sub-prompts can help with the analysis of the resulting recordings. Although sub-prompts are like all other prompts 1002, this disclosure will sometimes refer to sub-prompts using figure number 1008.

In various embodiments, one or more prompts and sub-prompts can be designed by the employer, the system administrator, or both to elicit candidate data about a job attribute that is not addressed by other prompts, such as prompts that are typical for the particular job opening. In one example, a healthcare employer looking for a Marketing Director needs someone who can assist the Director of Clinical Services to prepare training materials for clinicians. An example of a prompt designed to elicit whether the candidate has skills in this area is "Do you have any experience preparing training materials? If so, can you give an example of a successful training program and the steps you took to produce these materials?"

The candidate 104 typically provides oral answers or responses to the prompts 1002, but in some circumstances the candidate 104 will be prompted to do a physical activity, or to perform a skill. In any event, the candidate's response to the prompt 1002 will be recorded by the booth using cameras, microphones, and depth sensors. The booth computer 864 can be responsible for providing prompts 1002 and therefore can easily ascertain the timing at which each prompt 1002 is presented. In other embodiments, the server 106 can provide the prompts to the booth 110.

As shown in FIG. 10, each time segment 1010 is also associated with audio data 1012, 1014, visual data 1016, 1018, 1020, and sensor data 1022. The two audio segments 1012, 1014 represent the audio data recorded by each of the two microphones, respectively, during that time segment 1010. Similarly, three visual segments 1016, 1018, 1020 comprise the visual data recorded by each of the three cameras 222, 224, 226, respectively, during that segment 1010. The sensor segment 1022 constitutes the behavioral and position data recorded by sensor 228. Obviously, the number of separate audio segments 1012, 1014, visual segments 1016, 1018, 1020, and sensor segments 1022 depends upon the actual numbers of microphones, cameras, and sensors that are being used to record the candidate 104 in the booth, as there is a one-to-one relationship between the separate data elements (1012-1022) for a time segment 1010 and the recording devices recording the candidate 104.

The audio segments 1012, 1014 can be processed with a speech to text processor 1030. The output from the speech to text processor 1030 is the content data 5 1031. Similarly, output from processing the visual segments 1016, 1018, 1020 is content data 6 1033, and output from processing the sensor segment 1022 is content data 7 1035. All of these types of content data 1031, 1033, 1035 can be used to assign values to particular attributes for the candidate.

In FIG. 10, three different job criteria attributes 1024, 1026, 1028 are shown as being fed into the dynamic match evaluation module 342. The content data 1031, 1033, 1035 can be compared to the criteria 1024, 1026, 1028 in the dynamic match evaluation module to determine if the criteria 1024, 1026, 1028 are met. In other words, the job criteria attributes 1024, 1026, 1028 are compared against the candidate attributes derived from the content data 1031, 1033, 1035 to see the level of matching for these attributes.

Examples of criteria 1024, 1026, 1028 may relate to various candidate attributes that can be analyzed and rated using the data collected by the booth 110 or in the content provide by the candidate 104. For example, the criteria 1024, 1026, 1028 may be minimum scores for time management skills, team leadership skills, empathy, engagement, or technical competence. Other possible criteria include confidence, sincerity, assertiveness, comfort, or any other type of personality score that could be identified using known techniques based on an analysis of visual data, audio data, and depth sensor/movement data. Other possible criteria are a willingness to relocate in general, a willingness to relocate to the specific location of the job opening, the presence of a skill, or the presence of a certification.

In some embodiments, criteria attributes can be scored on a sliding scale scoring system. For example, the candidates can be asked "Would you be willing to move to Alaska?" A candidate's response of "Yes, I love Alaska. I have family there," can be scored more favorably, than a response of "yes" or "sure." The prompts can be configured to obtain data from the candidate that is not present in a resume.

For example, the response of "Yes, I love Alaska. I have family there," can receive a score of two, the response of "yes" or "sure" can receive a score of one, and a response of "no" can receive a score of zero. A minimum attribute score for a particular job in Alaska might be a score of 1 or higher, while a minimum score for real-time connection attribute would be a score of two or higher. A longer response with three or more positive words could get an even higher score of three.

Here are example scoring criteria for evaluating a response to a question about relocation to a particular location:

Score 0: A negative word is detected, such as no or "not really" or "not."

Score 1: At least one positive word is detected, such as "yes" or "sure".

Score 2:
a. At least two positive words are detected, such as "yes," "sure," "definitely," or "love," and
b. At least six total words are used in the response, and
c. A connection word (indicating the candidate has a connection to the location) is used in the response such as "family," or "friend."

In still further embodiments, the audio segment data 1012, 1014 is converted to textual content data 1031 using speech-to-text technology 1030, and the textual data becomes part of the behavior analysis. The recorded data 868 can include audio data, video data, and sensor data. The dynamic match evaluation 342 can incorporate the content data in analysis of the candidate's attributes compared to the criteria data from the employer.

Figure 11:
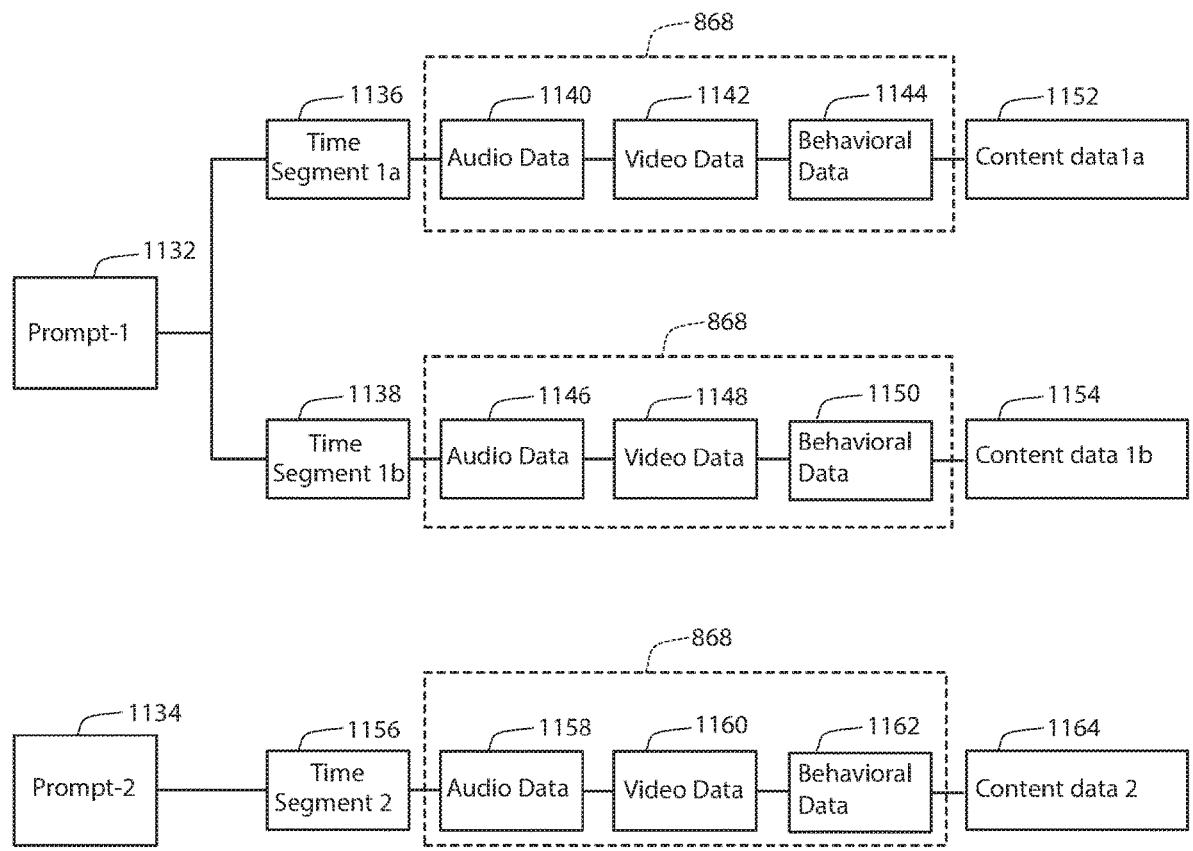
FIG. 11 is a schematic view of content data in accordance with various embodiments herein.

Content Data (FIG. 11)

FIG. 11 is a schematic view of content data is generated based on the analysis of recorded data linked to particular prompts, in accordance with various embodiments herein. FIG. 11 shows a first prompt 1132 and a second prompt 1134 that are provided to the candidate. In some embodiments, the candidate 104 can provide recorded data to the system 100, which is analyzed to obtain content data that is relevant to different job criteria attributes. For example, in responding to the first prompt 1132, the candidate's response can be separated into two time segments, a first time segment 1136 and a second time segment 1138. Each time segment 1136, 1138 can include recorded data 868. The first time segment recorded data 868 can include first segment audio data 1140, first segment video data 1142, and first segment behavioral data 1144. The second time segment recorded data 868 can include second segment audio data 1146, second segment video data 1148, and second segment behavioral data 1150. The first time segment data 1140, 1142, 1144 can be saved and analyzed to produce content data 1a 1152, which could be relevant to a first attribute. The second time segment data 1146, 1148, 1150 can be saved and analyzed to produce content data 1b 1154, which could be relevant to a second attribute.

A third time segment 1156 can follow the second prompt 1134. The third time segment recorded data 868 can include third segment audio data 1158, third segment video data 1160, and third segment behavioral data 1162. The third time segment data 1158, 1160, 1162 can be saved and analyzed to produce content data 1164, which could be relevant to a third attribute, or the first or second attribute.

As mentioned above, in some embodiments, the second prompt 1134 can be added or modified based on content data 1152 or content data 1154. In some embodiments, the prompts can be part of a frame or series of prompts. In some embodiments, the prompts can include one or more of an industry-specific frame of prompts, a job-specific frame of prompts, and an employer-specific frame of prompts.

Figure 12:
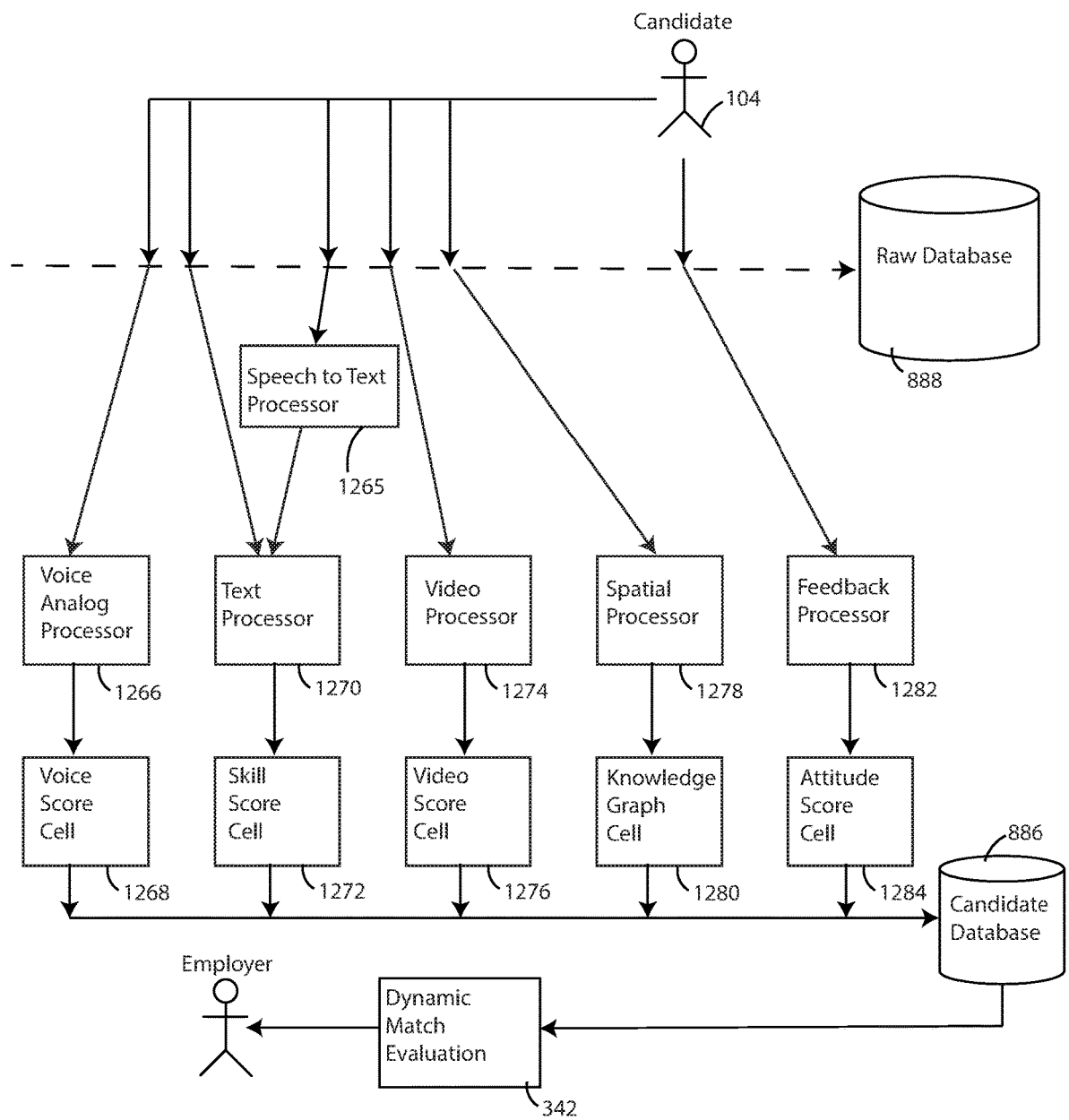
FIG. 12 is a schematic view of data on a server being stored in different databases in accordance with various embodiments herein.

Database Structure (FIG. 12)

FIG. 12 shows a schematic view of data storage on a server in accordance with various embodiments herein. In various embodiments, all of the recorded audio, video and sensor data can be stored in a raw database 888, wherein the data is in its raw form. The data can also be analyzed by various processors, such as a speech to text processor 1265, a voice analog processor 1266, a text processor 1270, a video processor 1274, a spatial processor 1278, and a feedback processor 1282.

In some embodiments, the speech to text processor 1265 can take audio data from the video interview and process it for a text output, such as by converting the audio file to a text file where the text file includes a textual transcript of the audio input. In some embodiments, a voice analog processor 1266 can process input audio to determine a voice score, such as a confidence score or a comfort score based on the candidate voice recording. In some embodiments, the text processor 1270 can evaluate text input either from the candidate directly or through the speech to text processor 1265. The text processor can determine subject matter that is present in the text input, such as skills the candidate discusses in an interview or skills the candidate discusses in a resume. The voice analog processor 1266 and text processor 1270 can evaluate the candidate's voice score (such as confidence or comfort) in view of the content or subject matter that the candidate is talking about from the text processor 1270.

In some embodiments, the video processor 1274 can process the video input, such as to determine the content of the video. Content of the video input can include analysis of the candidate's posture and other visual data.

In some embodiments, the spatial processor can process the sensor input, such as to determine the candidate's position in space during the video interview. The candidate's position in space can include hand gestures, posture, torso lean, shoulder position, and other body movements and positions.

In some embodiments, the feedback processor 1282 can process input from an employer after a video interview. The employer can provide feedback to the system, such as overall impression of the candidate and areas where the candidate was strong or weak.

The processors illustrated in FIG. 12 are not exhaustive, and other types of processors can be used in the system to evaluate if the candidate is a match for the job opening. The processors of the system can process the raw data and provide outputs to various cells, such as a voice score cell 1268, a skill score cell 1272, a video score cell 1276, a knowledge graph cell 1280, and an attitude cell 1284. In an example, the attitude cell 1284 can include an attitude score. The attitude score can be a rating of the candidate's attitude, such as while responding to a prompt. In one example, a candidate can receive a higher attitude score for responding to a prompt with "That would be my dream job; I would love an opportunity like that" compared to a candidate that responds with "Yes, I have all the skills and training for this type of roll, although I'm not sure its one I would enjoy."

These cells contain candidate attribute data, and in some embodiments are stored in the candidate database 886. The candidate attribute data can be input to the dynamic match evaluation module 342 and compared to criteria data provided by the employer. The cells illustrated in FIG. 12 are also not exhaustive, and many more can be established depending on the criteria sought by the employer and the analysis techniques that are performed on the recorded data.

Selectively Updating Cells in Candidate Database

In various embodiments, the cells can be updated or replaced when new data is made available, such as while the video interview progresses. In various embodiments, the cells are selectively updated or replaced only if the new data better satisfies the criteria of the job opening, and therefore showcases the candidate's strengths. In various embodiments, during a first time window, candidate data can be saved in the raw database 888 on the system server 106. The candidate data can be related to real-time connection attributes or minimum attributes. In an example, a first portion of candidate data is stored in a first cell that is associated with a first attribute in the candidate database 886 and a second portion of the candidate data is stored in a second cell that is associated with a second attribute in the candidate database 886. During a second time window, a third portion and a fourth portion of candidate data is collected and saved in the raw database. The third portion of candidate data can be associated with the first attribute and the fourth portion of candidate data can be associated with the second attribute.

Next, the system can compare the first portion of candidate data with the third portion of candidate data to determine which is more favorable for satisfying the first attribute. Similarly, the system can compare the second portion of candidate data with the fourth portion of candidate data to determine which is more favorable for satisfying the second attribute. As a result of determining the first portion of the candidate data is more favorable than the third portion of candidate data, the first portion of candidate data can be maintained in the cell. In contrast, as a result of determining the fourth portion of candidate data is more favorable than the second portion of candidate data, the fourth portion of candidate data can replace the second portion of candidate data in the cell.

The raw database 888 keeps all data regardless of when it was received from the candidate and stores it with a time stamp. The cell values in the candidate database 886 also include a time stamp in various embodiments. The candidate database 886 stores the content data, score data, and other data used to determine whether attributes of the job opening are satisfied. Because the candidate database 886 is selectively updated and does not store every piece of data for a particular candidate, the candidate database 886 can function more efficiently. Also, the selective updating process leads to a candidate database 886 that showcases the candidate by memorializing and maintaining the evaluation results of the candidate's best answers over time.

The second time window occurs after the first time window. The second time window can be a later portion of a response to a prompt. For example, in the context of FIG. 11, content data 1152 can be compared with content data 1154 to see which is more favorable as relevant to a particular attribute. The second time window can be a later portion of the same video interview. For example, in the context of FIG. 11, content data 1152 from time segment 1a could be compared with content data 1164 from later time while the candidate was responding to a different prompt, segment 2, to see which is more favorable as relevant to a particular attribute. In another example, the second time window can be a later video interview, such as occurring on a different date. In yet another example, the first time window can relate to the timeframe during which background data was gathered, such as when the candidate's profile was created or when the candidate's resume was submitted, while the second time window is the timeframe for a video interview.

TABLE 1

First video interview and second video interview

| | Raw Database | | Candidate Database | |
|---|---|---|---|---|
| Real-Time Connection Attributes: | Video Interview in Jun. 2018 | Video Interview in Jan. 2020 | After Jun. 2018 video interview | After Jan. 2020 video interview |
| Time management skill | High (first portion) | Medium (third portion) | First cell: High (first portion) | First cell: High (first portion) |
| OASIS Coding experience | Medium (second portion) | High (fourth portion) | Second cell: Medium (second portion) | Second cell: High (fourth portion) |

Table 1 shows an example of score cells in the candidate database after a second video interview. A first video interview takes place in June 2018, and the system gives the candidate a high score for his/her time management skills and a medium score for his/her OASIS coding experience. In a later interview occurring in January 2020, the system only gives the candidate a medium score for time management and a high score for OASIS coding experience. The candidate database after the January 2020 interview can include high scores for both time management and OASIS coding experience. In some cases, a candidate might discuss an attribute, such as time management, more in an earlier interview, but might not discuss it as much in a later interview. In some cases, the candidate can remember what he/she said and does not want to repeat themselves. In such a case, the candidate will not be penalized as the cell will not be updated with a lower score. In other scenarios, there could be a specific reason for the lower score. In such a scenario the system could update the cell with the lower score. The raw database can retain all of the data from the first video interview and the second video interview, while the candidate database can retain the data that best fits with the criteria data.

TABLE 2

First and second portion of one video interview

| | Raw Database | | Candidate Database | |
|---|---|---|---|---|
| Real-Time Connection Attributes: | First portion of video interview | Second portion of video Interview | After first portion of video interview | After second portion of video interview |
| Time management skill | High (first portion) | Medium (third portion) | First cell: High | First cell: High |
| Uses team-oriented "we" language | Rarely (second portion) | Frequently (fourth portion) | Second cell: Rarely (second portion) | Second cell: Frequently |

Table 2 shows an example of a cell being updated during a video interview, where the attribute cells related to time management and team leadership skills are being updated. The team leadership attribute cell might be updated, for example, according to how often the candidate was using team-oriented language (for example, using "we" more frequently than "I"), using positive language, and providing a detailed and complex response to the prompts. In some embodiments, a higher usage of team-oriented language can be indicative of a candidate that works well with others. In a first portion of the video interview, such as in response to a first prompt, the candidate can score highly for time management skills, but does not use much team-oriented language. However, in the second portion of the interview, such as responding to a second prompt, the candidate only shows medium time management skills, but frequently uses team-orientated language. The first cell for time management can remain high after the second portion. The second cell can be updated for the increase usage of team-oriented language after the second portion. The raw database can retain all of the data from the first portion of the video interview and the second portion of the video interview, while the candidate database can retain the data that best fits with the criteria data.

TABLE 3

Background Data and video interview data

| | Raw Database | | Candidate Database | |
|---|---|---|---|---|
| Real-Time Connection Attributes: | Background Data | Video Interview Portion | After Background Data | After Video Interview Portion |
| Spanish language fluency | Present (first portion) | Not present (third portion) | First cell: Present | First cell: Present |
| Excel skill | Not present (second portion) | High (fourth portion) | Second cell: Not present | Second cell: High |

Table 3 shows an example of a cells being updated during a video interview in comparison with background data. Background data is typically entered by the candidate when setting up their profile in the system or by inputting a resume, transcript, or other documentation. The cells shown in Table 3 relate to Spanish language fluency and Excel skill. From the background data, the raw data indicates that Spanish language fluency is present, but there is not any information on Excel skills. However, during or after the video interview, it is learned that the candidate has high Excel skills. Spanish language fluency was not mentioned during the video interview, such as because the data was already known so a prompt directed at Spanish language fluency was removed from the frame or never included. The first cell for Spanish language fluency can remain present after the video interview. The second cell can be updated for that candidate with high Excel skills, which was learned during the video interview. The raw database can retain all of the background data and the video interview data, while the candidate database can retain the data that best satisfies the criteria for the job opening.

Figure 13:
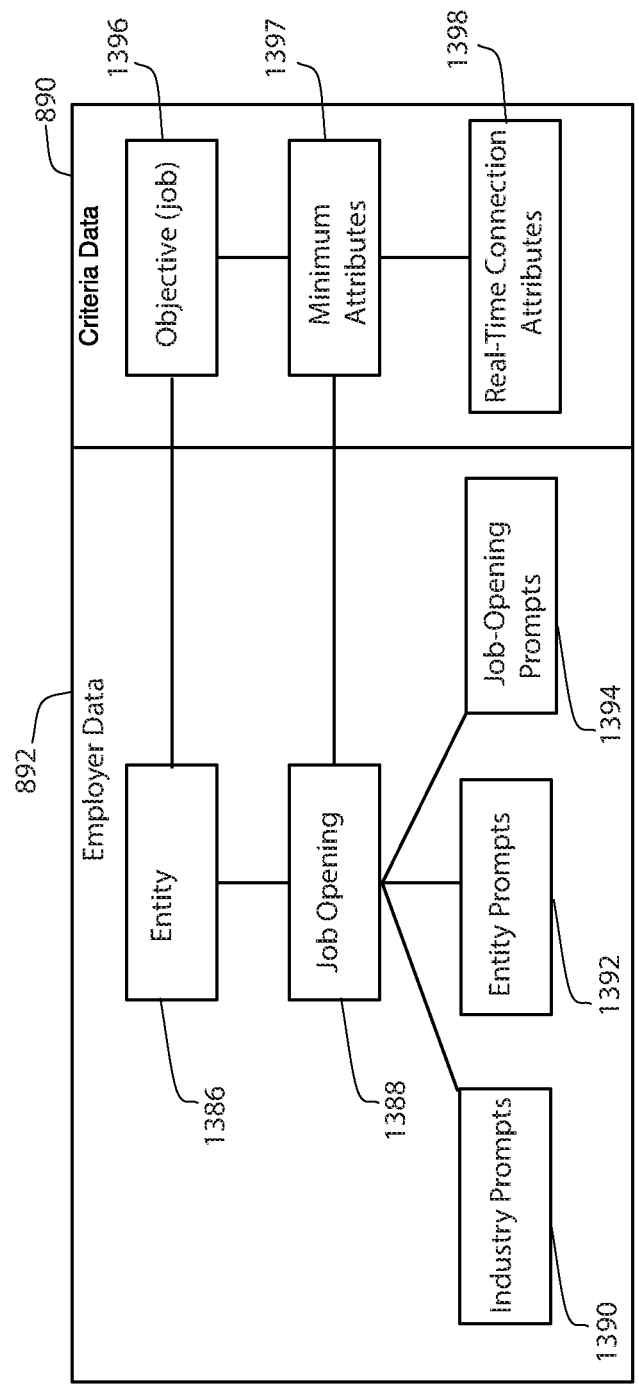
FIG. 13 is a schematic view of employer data and criteria data in accordance with various embodiments herein.

Frames of Prompts (FIG. 13)

FIG. 13 shows a schematic view of employer data and criteria data in accordance with various embodiments herein. Employer data 892 includes data about the entity 1386, such as their business mission, their industry, their number of employees, and the identity and role of the decision makers regarding hiring. Employer data 892 also include job opening data 1388, such as the title of the job opening, a description of the job opening, a salary range for the job opening, and other information about the job opening.

Employer data 892 can result in specific prompts being presented to the candidate 104 to determine if the candidate 104 fulfills the desired criteria attributes. In various embodiments, the entity 1386 of the employer can result in specific entity prompts 1392 being presented to the candidate 104. Similarly, the type of job opening 1388 can also result in specific job opening related prompts 1394. The type of industry the employer is in can also result in industry prompts 1390. The industry prompts 1390 can be a frame of prompts related to the industry. The entity prompts 1392 can be a frame of prompts related to the entity. The job opening prompts 1394 can be related to the job opening that the candidate is applying for. In some embodiments, additional prompts can be added to the frame of prompts based on textual video interview data received in response to a previous prompt.

The prompts are designed to gather information needed to analyze if the candidate would be a good match for the job (objective) 1396. The criteria data 890 is the criteria defined by the employer to assess a candidate's match with the job opening. The criteria includes minimum attributes 1397 and real-time connection attributes 1398 for the job 1396.

Figure 14:
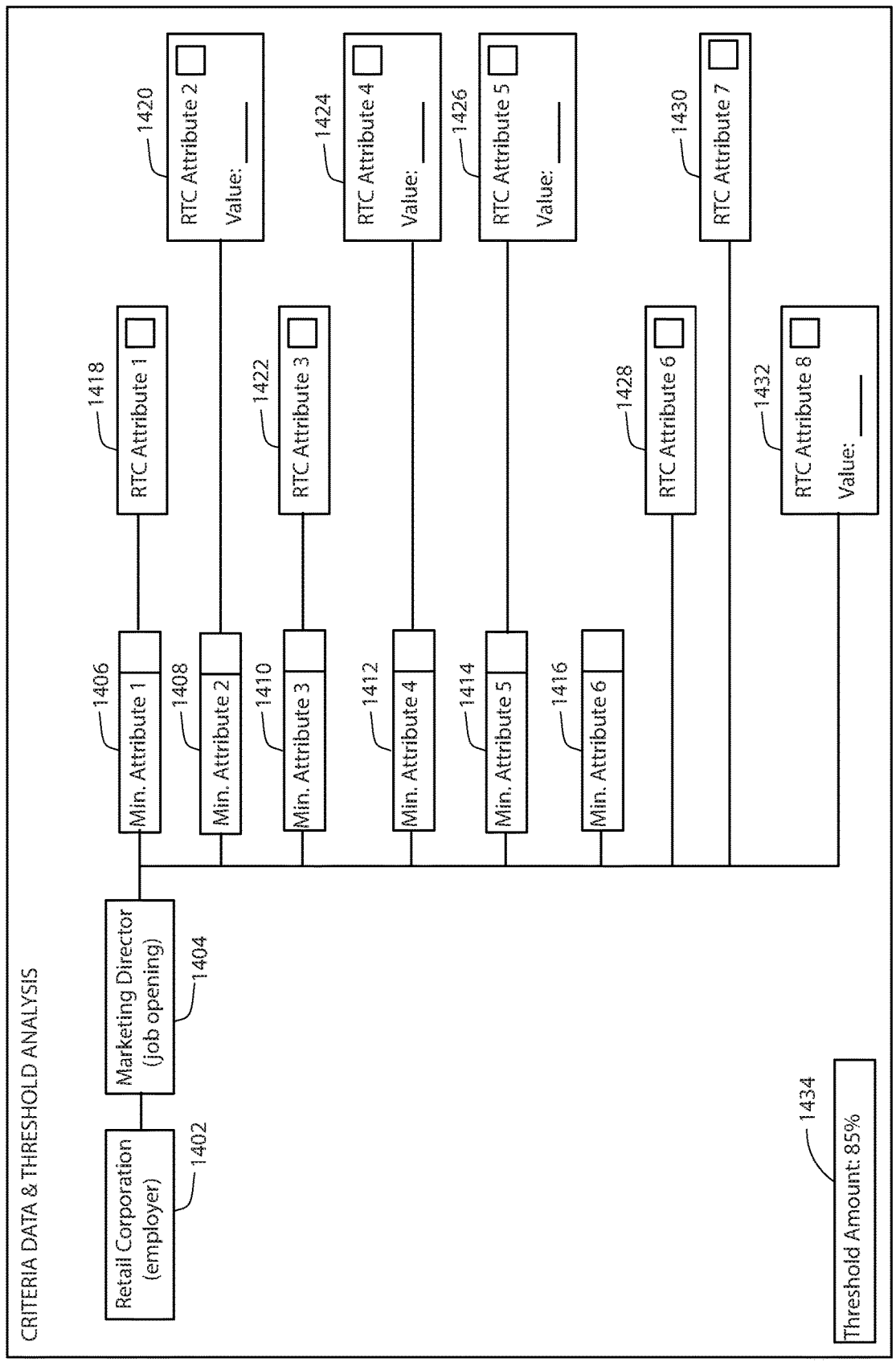
FIG. 14 is a schematic view of criteria data and real-time connection attribute threshold analysis in accordance with various embodiments herein.
Figure 15:
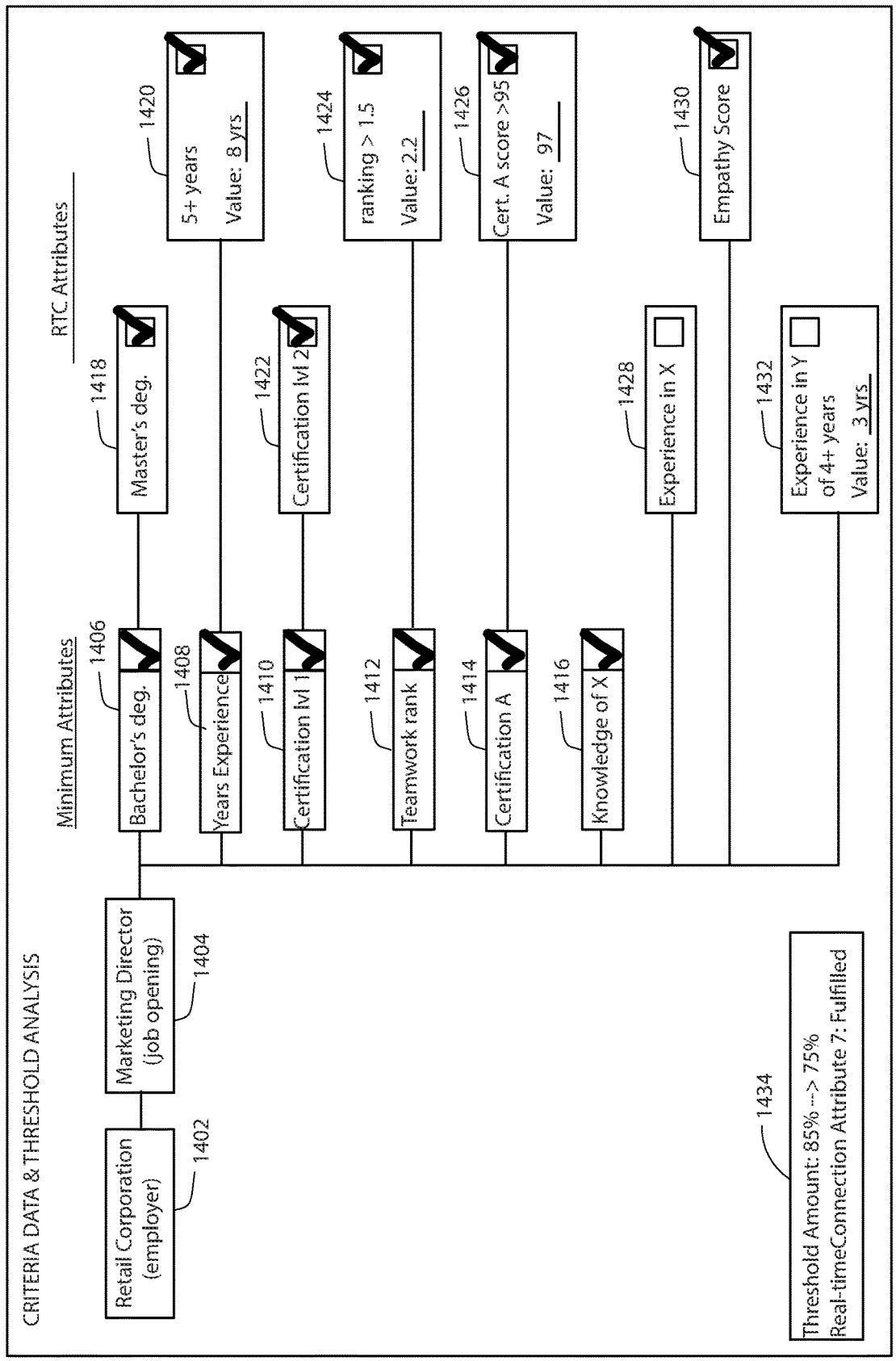
FIG. 15 is a schematic view of criteria data and real-time connection attribute threshold analysis in accordance with various embodiments herein.
Figure 16:
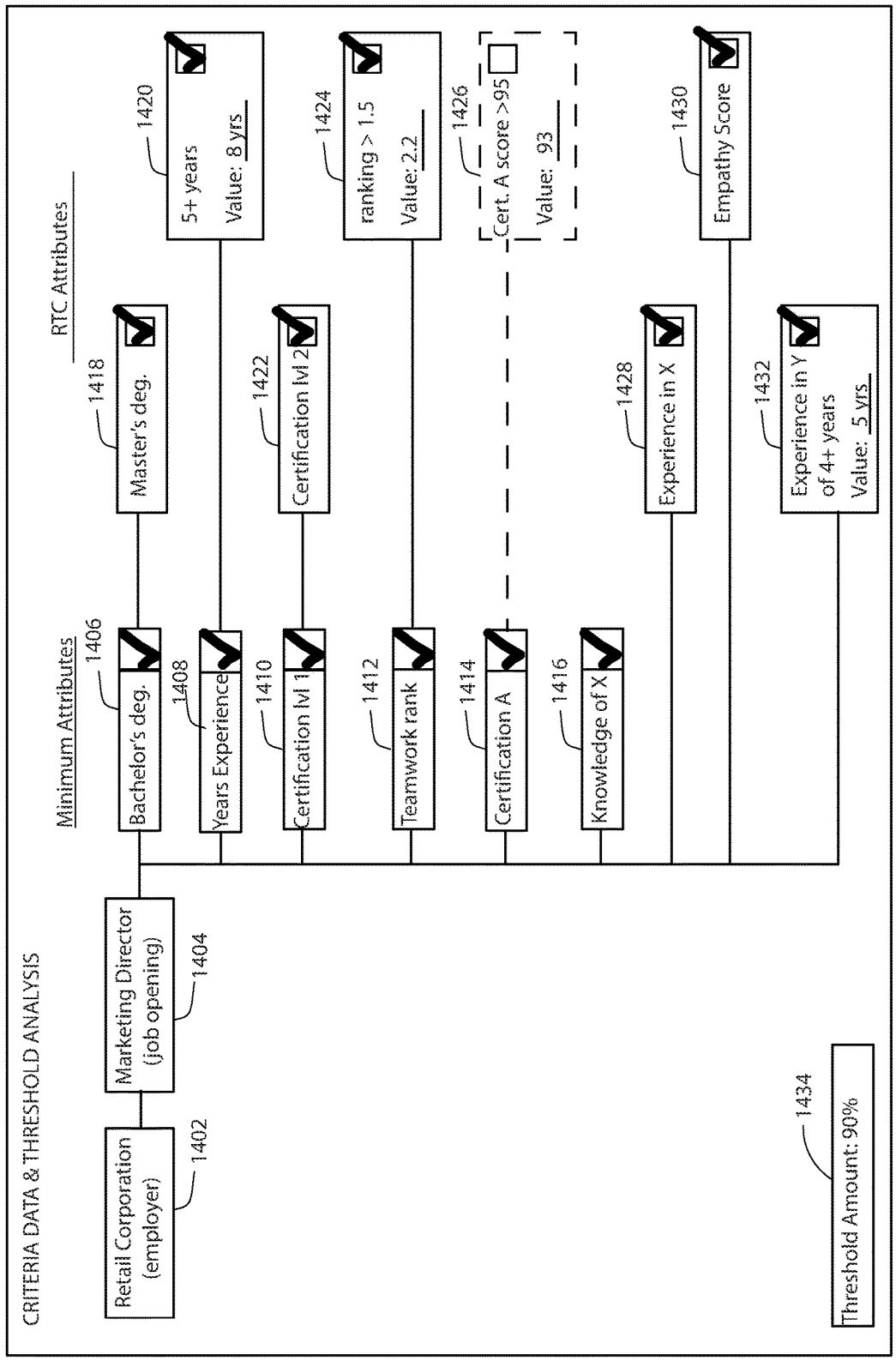
FIG. 16 is a schematic view of criteria data and real-time connection attribute threshold analysis in accordance with various embodiments herein.

Criteria Data and Threshold Analysis (FIGS. 14-16)

FIG. 14 shows a schematic of an example of criteria data and a real-time connection threshold for a particular job opening, in accordance with various embodiments herein. As mentioned earlier, the employer 1402 and the job opening 1404 can be linked to frames of prompts that are intended to ask the candidate 104 to provide desired information about themselves. The prompts can be tied to the minimum attributes and the real-time connection attributes. The minimum attributes and real-time connection attributes are part of the criteria data for a particular job opening. FIG. 14 shows a relationship of various minimum attributes 1406, 1408, 1410, 1412, 1414, 1416 and various real-time connection attributes 1418, 1420, 1422, 1424, 1426, 1428, 1430, 1432 for an example job opening of a marketing director 1404 in a retail corporation 1402. In some embodiments, one or more minimum attributes can be a prerequisite or pre-requirement for the real-time connection (RTC) attribute, such as shown for Min. Attribute 1 1406 and RTC Attribute 1 1418. One or more minimum attributes can stand alone, such that there is not a higher or more desirable attribute associated with the minimum attribute, such as shown for Min. Attribute 6 1416. Similarly, one or more real-time connection attributes can stand alone, such that there is not a prerequisite or pre-requirement for the real-time connection attribute, such as shown for RTC attribute 6 1428.

In some embodiments, the threshold 1434 for qualifying for a real-time connection opportunity can be a percentage of real-time connection attributes being met or fulfilled in the candidate data. In the example shown in FIG. 14, the threshold amount is at 85%. Therefore, once a candidate was determined to have met at least seven of the eight real-time connection attributes, or 88% of the real-time connection attributes, the first offer would be sent to the employer 102.

In some embodiments, it is required that all of the real-time connection attributes are fulfilled before a first offer is sent to the employer.

It should be understood that different number of real-time connection attributes and/or minimum attributes can be used. Six minimum attributes and eight real-time connection attributes is shown as one example.

In some embodiments, the threshold amount 1434 can be reduced or modified based on one of the real-time connection attributes being fulfilled, such as a very desirable or rare skill. FIG. 15 is a schematic view of criteria data for the Marketing Director job opening of FIG. 14, and also indicates whether content data from a particular candidate satisfies the criteria data. FIG. 15 shows a different threshold for the real-time connection attributes compared to FIG. 14.

In FIG. 15, it is shown that all of the minimum attributes have been met and six of the eight real-time connection attributes have been met.

As an example of various minimum attributes, FIG. 15 shows a bachelor degree for minimum attribute 1 1406, a certain number of years of experience for minimum attribute 2 1408, a certification level for minimum attribute 3 1410, and a teamwork ranking of a certain level for minimum attribute 4 1412. In some embodiments, a teamwork ranking can be an internal score calculated by the system, such as a score reflecting the frequency of use of team-oriented language. FIG. 15 further shows a certification A required for minimum attribute 5 1414, and knowledge of a particular topic, represented by "X," for minimum attribute 6 1416. Knowledge of X could be determined by analyzing the video interview data after a prompt about X. It should be understood that these examples of minimum attributes could also be real-time connection attributes.

As an example of various real-time connection attributes, FIG. 15 shows a master's degree for real-time connection attribute 1 1418. At least five years of experience is required for minimum attribute 2 1420. Some attributes can have a value associated with them, such as the number of years of experience for real-time connection attribute 2 1420. A certification level of two, which is higher than the minimum attribute certification level 1410, is required for real-time connection attribute 3 1422. A teamwork score above a certain level or threshold is required for real-time connection attribute 4 1424, which is higher than required for minimum attribute 1412. For real-time connection attribute 5 1426, in addition to obtaining the certification A, a score of at least 95 is required. For real-time connection attribute 6 1428, experience in X is required. An empathy score, such as an empathy score calculated by the system, is required for real-time connection attribute 7 1430. At least four years of experience in Y is required for real-time connection attribute 8 1432. It is noted that the checkmarks are used to show which minimum attributes and real-time connection attributes are fulfilled by the candidate data in the example analysis of FIG. 15.

In FIG. 15, the threshold amount 1434 has been reduced from 85% to 75% based on real-time connection attribute 7 1430 being fulfilled. The candidate 104 has met 75% of the real-time connection attributes, so the candidate 104 has now met the threshold amount 1434, and the offer to connect in real time will be sent to the employer. In other embodiments, the threshold amount could be reduced for having a certain skill, certification, years of experience, or a score within a desired range.

In some embodiments, the list of real-time connection attributes can be reduced or modified based on one of the real-time connection attributes being fulfilled, such as a very desirable or rare skill. FIG. 16 is a schematic view of criteria data for the Marketing Director job opening of FIG. 14, and also indicates whether content data from a particular candidate satisfies the criteria data. FIG. 16 shows a different threshold analysis process for the real-time connection attributes compared to FIG. 14 or FIG. 15. In the example of FIG. 16 and unlike the example in FIG. 15, the candidate fulfills real-time connection attribute 6 1428 and real-time connection attribute 8 1432, by having experience in X and 5 years of experience in Y. However, the candidate in FIG. 16 only scored a 93 on Certification A, which is below the requirement of 95. As such, the candidate in FIG. 16 does not fulfill real-time connection attribute 5 1426.

In FIG. 16, it is shown that all of the minimum attributes have been met and seven of the eight real-time connection attributes have been met. In FIG. 16, the threshold amount 1434 is at 90%. However, real-time connection attribute 5 1426 has been removed from consideration because the real-time connection attribute 7 1430 was fulfilled. As a result of one of the real-time connection attributes being removed, the overall percentage is above the threshold. The offer for a real-time connection will be sent.

Prequalification for Real Time Connection (FIGS. 17-20)

Figure 17:
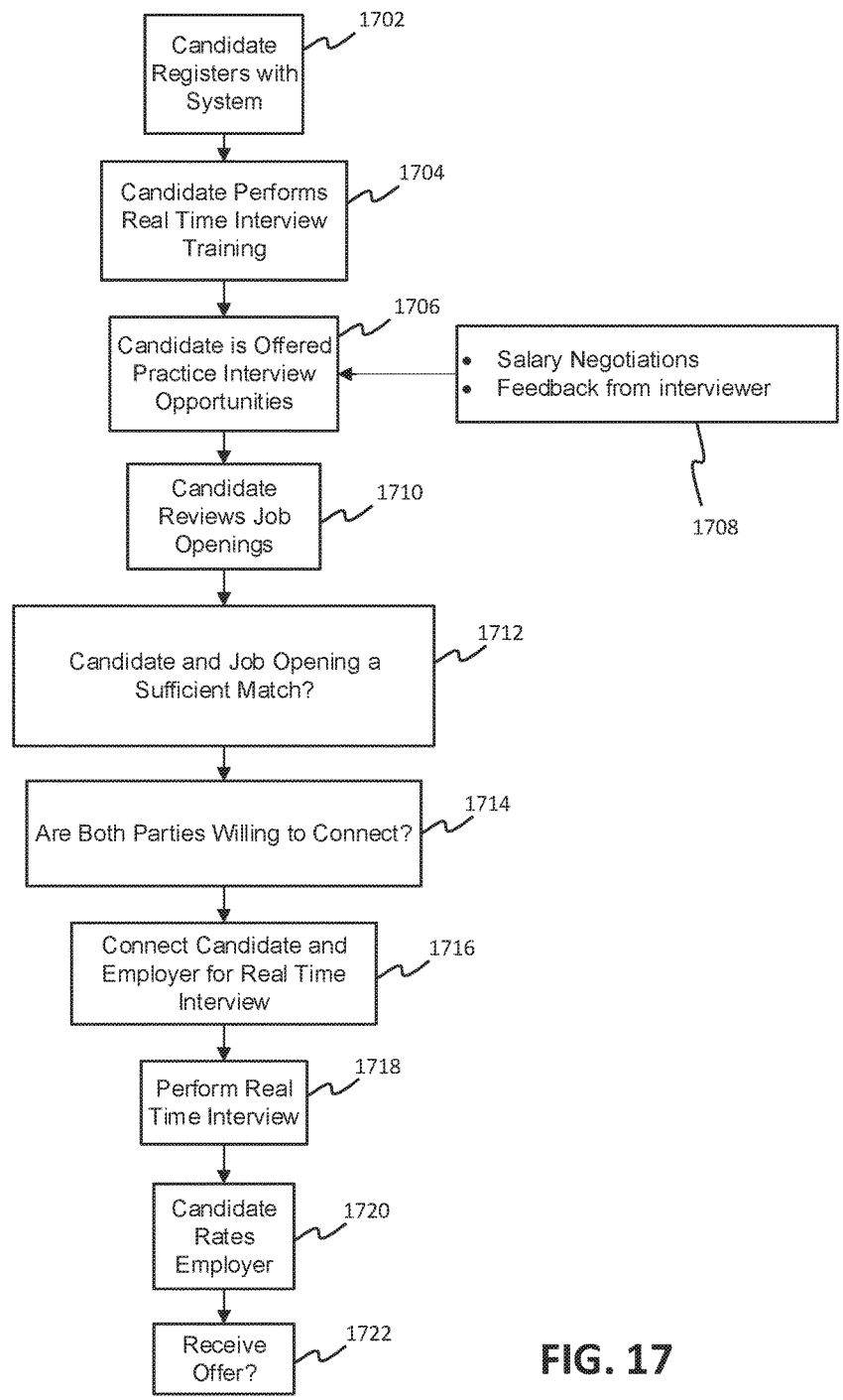
FIG. 17 is a flowchart depicting steps for prequalification and a real-time interview for a candidate and performed by the system in accordance with various embodiments herein.

FIG. 17 is a flowchart depicting steps for a candidate and performed by the system in accordance with various embodiments herein. In an initial step, the candidate can register with the system 1702, such as providing personally identifying information and background data. The candidate can then go through training or practice with the system 1704, such as to ensure the candidate is comfortable using the interface when they are eventually connected in real time with an employer. In some embodiments, the candidate can be offered mock or practice interviews 1706. In some embodiments, the mock real-time connection interviews can be with employers that are also training or practicing. Connecting new employers with new candidates for mock interviews can ensure both parties are familiar with the system and have practice with the system and with interviewing prior to actually applying for a job or conducting an interview. After the mock interviews, the employer or system can provide the candidate with feedback about the interview or with an expected salary range the candidate could expect when he/she is eventually hired at step 1708.

After the initial steps 1702 to 1708, the candidate can review job openings 1710. If a candidate is applying for a job opening, such as through a video interview, the system can determine the candidate and the position are sufficient match to result in a real-time connection 1712. The system can determine if both parties are willing and able to connect 1714, as discussed in more detail elsewhere herein. If the employer accepts the offer for a real-time connection, then the system can offer a real-time connection to the candidate. If both parties are willing and able to connect, they can be connected in real time 1716. A real-time interview can be conducted via the real-time connection at step 1718. After the real-time connection, ends the candidate can rate the employer 1720. In some embodiments, the candidate can receive an offer from the employer 1722, feedback, or an expected salary range for a position that they would be qualified for according to the employer.

Figure 18:
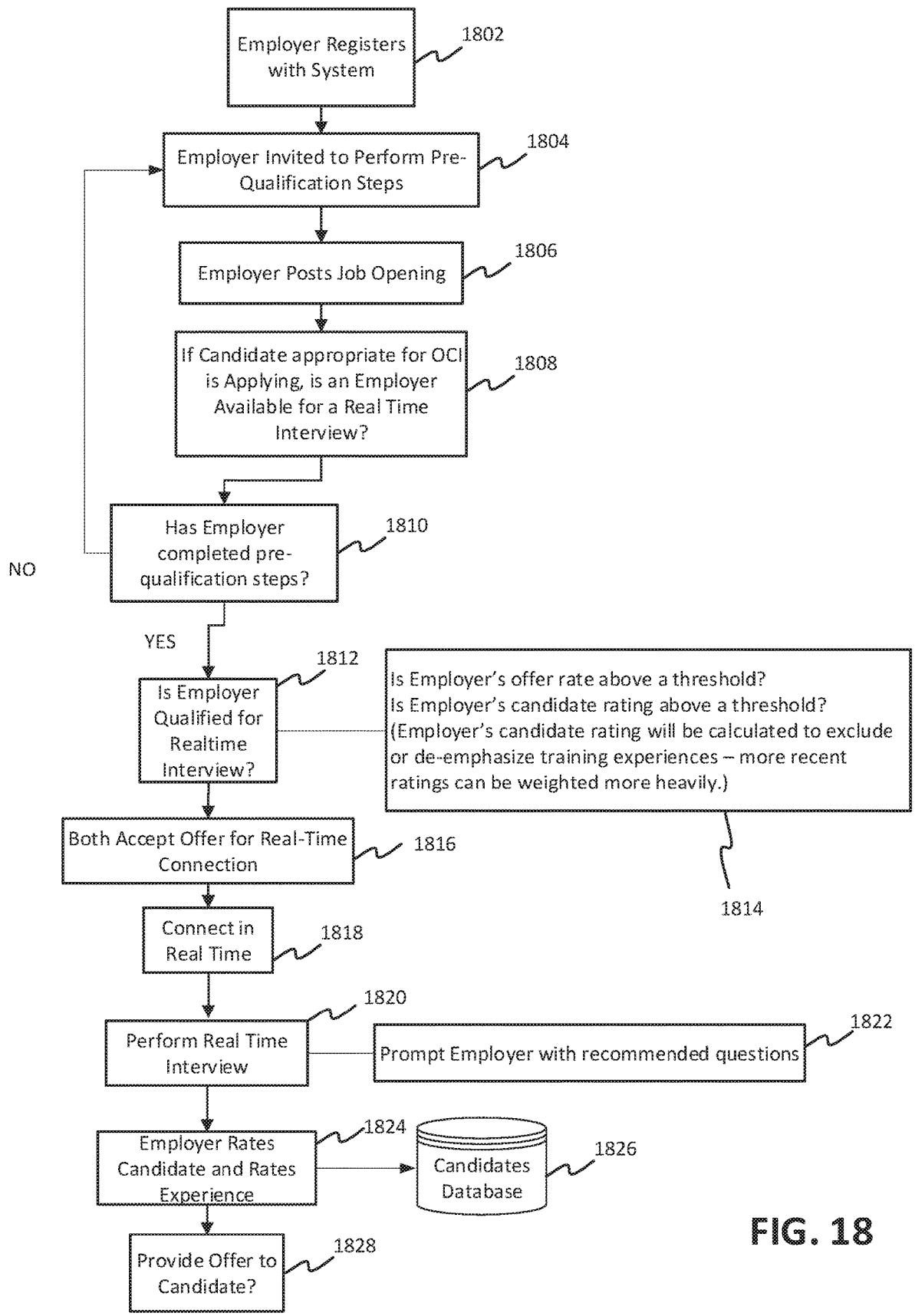
FIG. 18 is a flowchart depicting steps for prequalification and a real-time interview for an employer and performed by the system in accordance with various embodiments herein.

FIG. 18 is a flowchart depicting steps for an employer and performed by the system in accordance with various embodiments herein. In an initial step the employer can register with the system 1802. The employer can be invited to perform pre-qualification steps 1804, such as mock interviews discussed above. The employer can post one or more job openings 1806. A candidate can qualify for a real-time connection 1808. The system can ensure the employer has completed the pre-qualification steps 1810. If not, the employer will again be invited to complete the pre-qualification steps. If the employer has completed the pre-qualification steps, the system can determine if the employer is qualified for a real-time connection 1812. Various aspects can be used to determine if the employer is qualified 1814. In some embodiments, offer rate can be used to determine if an employer is qualified, such as to ensure employers are not wasting the time of high-value candidates. The candidate's rating of the employer can also be considered.

If both parties are qualified and the system has identified candidate that meets the real-time connection attributes of the employer for a particular job opening, the two parties can be offered a real-time connection 1816, as discussed in more detail elsewhere herein. If both parties accept the offer, the two parties will be connected in real time 1818, such as by fulfilling the threshold of real-time connection attributes and both being prequalified. The real-time interview can take place 1820. During the interview, in some embodiments, the system can provide prompts to the employer 1822, such as questions to ask. After the real-time connection ends, the employer can rate the candidate 1824. The rating can be saved or stored in the candidate database 1826. In some embodiments, the system can finally provide an offer to the candidate 1828.

Figure 19:
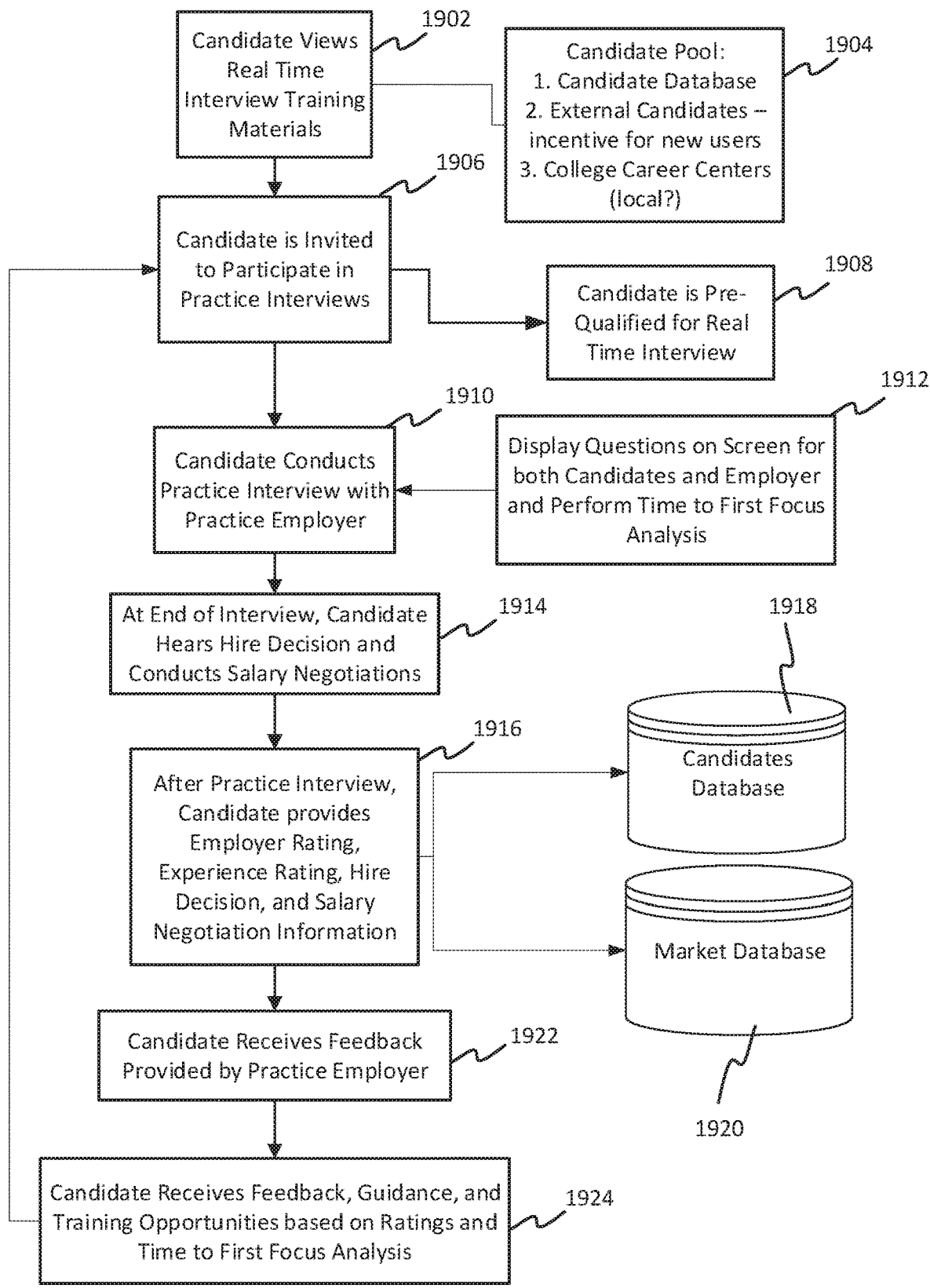
FIG. 19 is a flowchart depicting steps for practice interviews for a candidate and performed by the system in accordance with various embodiments herein.

FIG. 19 is a flowchart depicting pre-qualification steps for a candidate and performed by the system in accordance with various embodiments herein. In an initial step the candidate can view real-time training materials 1902. The pool of candidates 1904 can be developed from a variety of sources, such as a current candidate database, external candidate referrals, or career centers. The candidate can be invited to participate in practice interview 1906. The candidate is pre-qualified for real-time connection 1908. The candidate can conduct practice or mock interviews with employers 1910. Questions can be displayed for both the candidate and the employer 1912. At the end of the interview, the candidate can be provided a mocking hiring decision and/or mock salary negotiations 1914. After the practice interview, the candidate provides an employer rating, an experience rating, a hiring decision (acceptance or not) and salary negotiation information 1916. This information can be stored in the candidate database 1918 and the market database 1920. The candidate can receive feedback provide by the practice employer 1922, such as to help the candidate in future interviews. Finally, the candidate receives feedback, guidance and training opportunities based on ratings and time to first focus analysis 1924.

Figure 20:
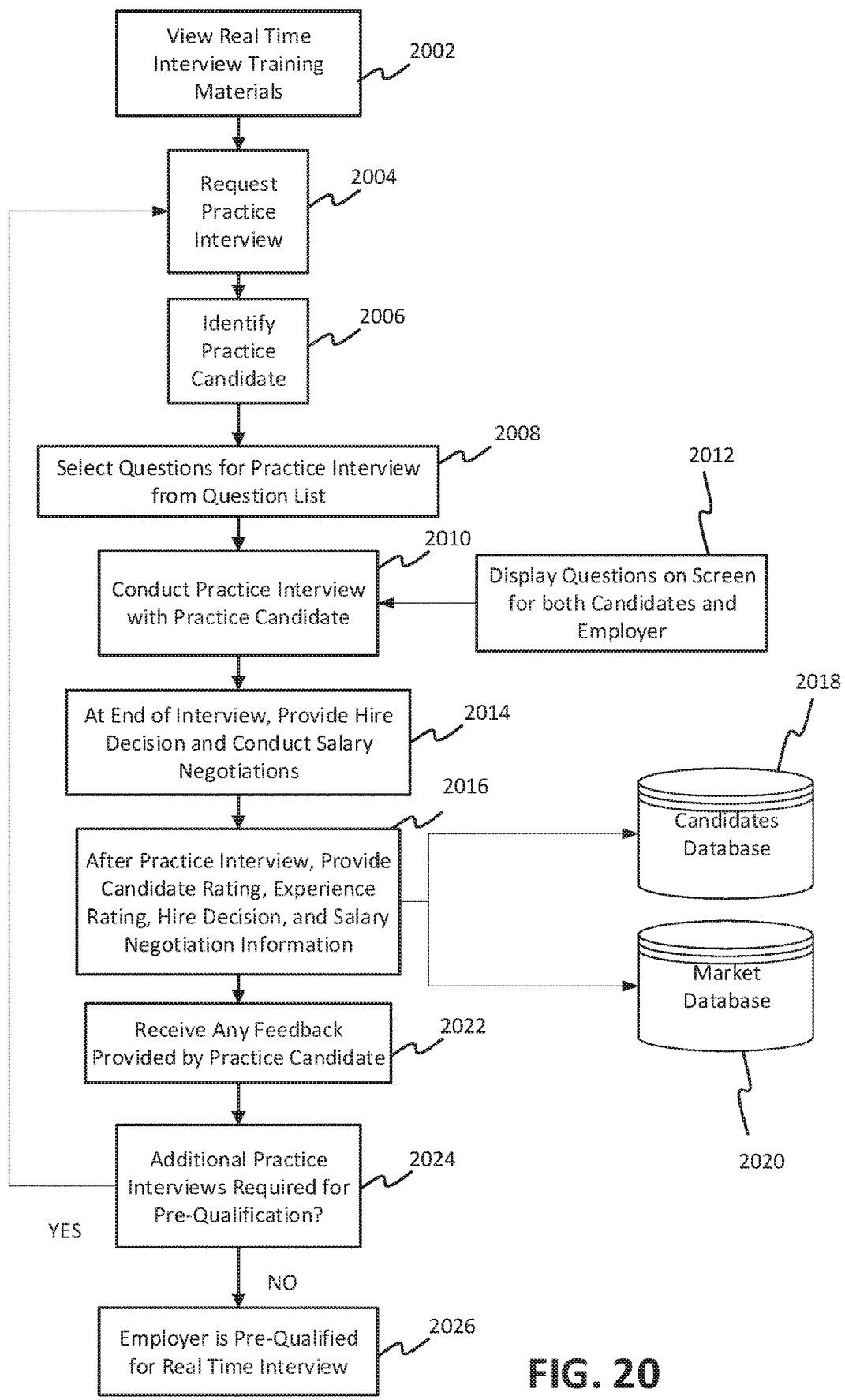
FIG. 20 is a flowchart depicting steps for practice interviews for an employer and performed by the system in accordance with various embodiments herein.

FIG. 20 is a flowchart depicting pre-qualification steps for an employer and performed by the system in accordance with various embodiments herein. In an initial step the employer can view training materials 2002. The system can request the employer perform practice interviews 2004. A practice candidate can be identified 2006. Questions for the practice interview can be selected from a pool or database of questions 2008. The practice interview can be conducted 2010 with questions displayed to both the employer and the candidate 2012. At the end of the interview, the employer can provide a mock hiring decision to the candidate and conduct mock salary negotiations 2014. After the practice interview, the employer can provide candidate rating, experience rating hiring decision and salary negotiation information 2016. This information can be stored in the candidate database 2018 and the market database 2020. The employer can receive feedback from the candidate 2022. In some embodiments, additional practice interviews can be required for pre-qualification 2024. The employer can be pre-qualified for a real-time connection 2026.

This application is related to U.S. patent application Ser. No. 16/828,578, titled "Multi-Camera Kiosk," filed on Mar. 24, 2020, which claims the benefit of U.S. Provisional Application No. 62/824,755, filed Mar. 27, 2019. This application is also related to U.S. patent application Ser. No. 16/366,746, titled "Automatic Camera Angle Switching to Create Combined Audiovisual File," filed on Mar. 27, 2019, and U.S. patent application Ser. No. 16/366,703, titled "Employment Candidate Empathy Scoring System," filed on Mar. 27, 2019, and U.S. patent application Ser. No. 16/696,781, titled "Multi-Camera, Multi-Sensor Panel Data Extraction System and Method," filed on Nov. 27, 2019. This application is also related to provisional patent application 63/004,329, titled "Audio and Video Recording and Streaming in a Three-Computer Booth," filed on May 1, 2020. This application is also related to U.S. patent application Ser. No. 16/931,964, titled "Automatic Versioning of Video Presentations," filed on Jul. 17, 2020. Each of these related applications are also hereby incorporated by reference in their entireties.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 3, 5, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A method of connecting two computers, comprising:
receiving, at a non-transitory computer memory, criteria data from an employer regarding a job opening, wherein the criteria data from the employer comprises minimum attributes and real-time connection attributes, wherein the non-transitory computer memory comprises a candidate database;
creating a candidate profile for a candidate in the candidate database;
storing background data as candidate data in the candidate profile;
recording audio data and video data of the candidate in a video interview of the candidate in a booth with a first camera, a second camera, and a microphone;

recording behavioral data of the candidate with at least one depth sensor disposed in the booth;

extracting textual interview data from the audio data of the candidate with speech-to-text analysis, wherein extracting the textual interview data of the candidate occurs while recording additional audio data of the candidate;

storing the textual interview data as additional candidate data in the candidate profile;

extracting behavioral interview data from the behavioral data, wherein extracting the behavioral interview data occurs while recording additional behavioral data of the candidate;

storing the behavioral interview data as additional candidate data in the candidate profile;

comparing the minimum attributes to the candidate data to determine if the minimum attributes are satisfied by the candidate data while continuing to record audio data, video data, and behavioral data of the candidate, if the minimum attributes are present in the candidate data, then comparing the real-time connection attributes to the candidate data to determine if a threshold amount of the real-time connection attributes are satisfied by the candidate data;

sending, while continuing to record audio data, video data, and behavioral data of the candidate, over a communication network, an offer to a first remote computer for a real-time connection with the booth if the threshold amount of real-time connection attributes are satisfied by the candidate data; and after the first remote computer sends an acceptance of the offer for a real-time connection with the booth, sending, over the communication network, an offer to a user interface of a booth computer at the booth for the real-time connection with the first remote computer; and connecting the first remote computer and the booth computer in real time, after an acceptance is received from the user interface in response to the offer for a real-time connection by establishing a live audio connection or a live audio and video connection.

2. The method of claim 1, wherein the textual video interview data fulfills real-time connection criteria data that is not fulfilled by the background data.

3. The method of claim 1, further comprising:

during a first time window, saving a first portion of candidate data and a second portion of candidate data in a raw database, wherein the first portion of candidate data is related to a first real-time connection attribute and the second portion of the candidate data is related to a second real-time connection attribute;

storing the first portion of candidate data within a first cell associated with the first real-time connection attribute in the candidate database;

storing the second portion of candidate data within a second cell associated with the second real-time connection attribute in the candidate database;

during a second time window later than the first time window, saving a third portion of candidate data and a fourth portion of candidate data in the raw database, wherein the third portion of candidate data is related to the first real-time connection attribute and the fourth portion of candidate data is related to the second real-time connection attribute;

comparing the first portion of candidate data with the third portion of candidate data to determine which is more favorable for satisfying the first real-time connection attribute;

as a result of determining that the first portion of candidate data is more favorable, maintaining the first portion of candidate data in the first cell;

comparing the second portion of candidate data with the fourth portion of candidate data to determine which is more favorable for satisfying the second real-time connection attribute; and as a result of determining that the fourth portion of candidate data is more favorable, replacing the second portion of candidate data with the fourth portion of candidate data in the second cell.

4. The method of claim 1, wherein the user interface is configured to display prompts to the candidate for asking the candidate to speak and provide audio data and video data, the method further comprising:

storing, at a system server, a first frame of prompts comprising at least a first prompt and a second prompt, displaying the first prompt and second prompt to the candidate;

wherein the step of recording audio data and video data of the candidate comprises recording the candidate's responses to the first prompt and second prompt in the video interview;

wherein a third prompt is displayed after the second prompt, wherein a decision to display a third prompt is based on textual video interview data received in response to the one of the first or second prompt.

5. The method of claim 4, wherein the first frame of prompts is associated with an industry of the job opening, the method further comprising:

receiving, at a system server, a second frame of prompts comprising at least a fourth prompt and a fifth prompt, wherein the second frame of prompts is associated with the employer;

receiving, at a system server, after receiving the criteria data, a third frame of prompts comprising at least a sixth prompt and a seventh prompt, wherein the third frame of prompts is associated with the job opening; and displaying the fourth prompt, fifth prompt, and sixth prompt to the candidate;

wherein the step of recording audio data and video data of the candidate comprises recording the candidate's responses to the fourth prompt, fifth prompt, and sixth prompt in the video interview.

6. The method of claim 1, further comprising prompting, via a first candidate interface, the candidate to talk more about an aspect of the textual interview data in response to analysis of the textual interview data.

7. The method of claim 1, wherein the threshold amount is a percentage of the real-time connection attributes being met.

8. The method of claim 1, further comprising eliminating a real-time connection attribute upon determining the candidate's experience level is above a threshold experience level.

9. The method of claim 1, further comprising reducing the threshold amount of real-time connection attributes upon determining the candidate's experience level is above a threshold experience level.

10. The method of claim 1, further comprising eliminating a real-time connection attribute from the criteria data upon determining the presence of a skill that fulfills a different real-time connection attribute.

11. The method of claim 1, further comprising reducing the threshold amount of real-time connection attributes upon determining the presence of a skill that fulfills a real-time connection attribute.

12. The method of claim 1, further comprising:
analyzing the textual interview data with a salary analysis module;
based on the analysis of the salary analysis module, generating a predicted salary range for the candidate; and
providing the predicted salary range to the candidate at the end of the video interview.

13. The method of claim 1, wherein a conclusion relating the textual interview data with the behavioral data fulfills a real-time connection attribute.

14. The method of claim 13, wherein the conclusion comprises a level of excitement, engagement, or enthusiasm about a discussed subject matter.

15. The method of claim 13, wherein sending the offer to the first remote computer happens while continuing to record audio data, video data, and behavioral data.

16. A method of connecting two computers, comprising:
storing criteria data in a non-transitory computer memory, wherein the criteria data comprises minimum attributes and real-time connection attributes, wherein the non-transitory computer memory comprises a database;
creating an individual profile in the database;
storing background data as individual data in the individual profile;
sending prompts to a user interface in a booth with a booth computer;
recording audio data and video data in the booth with a first camera, a second camera, and a microphone;
recording physical data with at least one depth sensor disposed in the booth;
extracting textual data from the audio data with speech-to-text analysis, wherein extracting the textual data occurs while recording additional audio data;
storing the textual data as additional individual data in the individual profile;
extracting behavioral data from the physical data, wherein extracting the behavioral data occurs while recording additional physical data;
storing the behavioral data as additional individual data in the individual profile;
comparing the minimum attributes to the individual data in the individual profile to determine if the minimum attributes are satisfied by the individual data while continuing to record audio data, video data, and depth data within the booth;
after determining that the minimum attributes are present in the individual data in the individual profile, comparing the real-time connection attributes to the individual data in the individual profile to determine if a threshold amount of the real-time connection attributes are satisfied by the individual data;
sending, while continuing to record audio data, video data, and depth data within the booth, over a communication network, an offer to a first remote computer for a real-time connection with the booth after determining that the threshold amount of real-time connection attributes are satisfied by the individual data;
after the first remote computer accepts the offer for a real-time connection with the booth, sending a second offer over the user interface for the real-time connection with the first remote computer; and
connecting the first remote computer and the booth computer in real time, after an acceptance is received from the user interface in response to the second offer for a real-time connection by establishing a live audio connection or a live audio and video connection.

* * * * *